United States Patent
Takeda et al.

[11] Patent Number: 5,859,740
[45] Date of Patent: Jan. 12, 1999

[54] INFORMATION STORAGE DISC AND INFORMATION RECORDING AND REPRODUCING APPARATUS

[75] Inventors: Toru Takeda, Saitama; Nobuhiro Hayashi, Kanagawa; Noriyuki Yamamoto, Tokyo, all of Japan

[73] Assignee: Sony Corporation, Japan

[21] Appl. No.: 777,004

[22] Filed: Jan. 3, 1997

Related U.S. Application Data

[63] Continuation of Ser. No. 191,120, Feb. 3, 1994, abandoned.

[30] Foreign Application Priority Data

Feb. 9, 1993 [JP] Japan ................................. 5-044644

[51] Int. Cl.⁶ ............................................... G11B 5/596
[52] U.S. Cl. ............................ 360/77.02; 360/78.04; 360/48
[58] Field of Search ........................... 360/77.08, 77.02, 360/77.04, 78.14, 78.04, 76, 75, 48, 53

[56] References Cited

U.S. PATENT DOCUMENTS

| | | | |
|---|---|---|---|
| 4,300,174 | 11/1981 | Harman et al. | 360/78.04 |
| 4,823,212 | 4/1989 | Knowles et al. | 360/77.08 |
| 4,945,427 | 7/1990 | Cunningham | 360/75 |
| 5,012,375 | 4/1991 | Nishimura | 360/119 |
| 5,138,511 | 8/1992 | Hoshimi et al. | 360/135 |
| 5,255,131 | 10/1993 | Coker et al. | 360/48 |
| 5,257,149 | 10/1993 | Meyer | 360/78.14 |
| 5,369,535 | 11/1994 | Hetzler | 360/78.14 |

FOREIGN PATENT DOCUMENTS

| | | |
|---|---|---|
| 0269381 | 6/1988 | European Pat. Off. . |
| 0275747 | 7/1988 | European Pat. Off. . |
| 0327207 | 8/1989 | European Pat. Off. . |
| 0420693 | 4/1991 | European Pat. Off. . |
| 0428325 | 5/1991 | European Pat. Off. . |
| 0433059 | 6/1991 | European Pat. Off. . |
| 0479703 | 4/1992 | European Pat. Off. . |
| 0495471 | 7/1992 | European Pat. Off. . |
| 0517478 | 12/1992 | European Pat. Off. . |
| WO8301858 | 5/1983 | WIPO . |

OTHER PUBLICATIONS

European Search Report, Appln. No. EP 94 40 0272, dated Apr. 26, 1995.

IBM Technical Disclosure Bulletin, Nov. 1975, vol. 18, pp. 1744–1745.

IBM Technical Disclosure Bulletin, Nov. 1985, vol. 28, p. 2582.

*Primary Examiner*—Andrew L. Sniezek
*Attorney, Agent, or Firm*—Ronald P. Kananen

[57] ABSTRACT

An information recording and reproducing apparatus and an information storage disc for use therewith. The information storage disc has ID storage areas formed in predetermined locations in the radial direction of the disc, the ID storage areas storing either sector or track numbers previously and magnetically. In this setup, if the read head is dislodged from the center line of a given track, the read head still reads the sector number correctly. The information recording and reproducing apparatus has the read head and the write head arranged so that they are positioned on a given intermediate track in a substantially aligned manner. With the write head positioned on a given track, the read head is dislodged from that track only by a negligible distance. This allows the read head to read sector and track numbers unfailingly from the disc.

7 Claims, 25 Drawing Sheets

FIG.I
PRIOR ART

F I G. 13
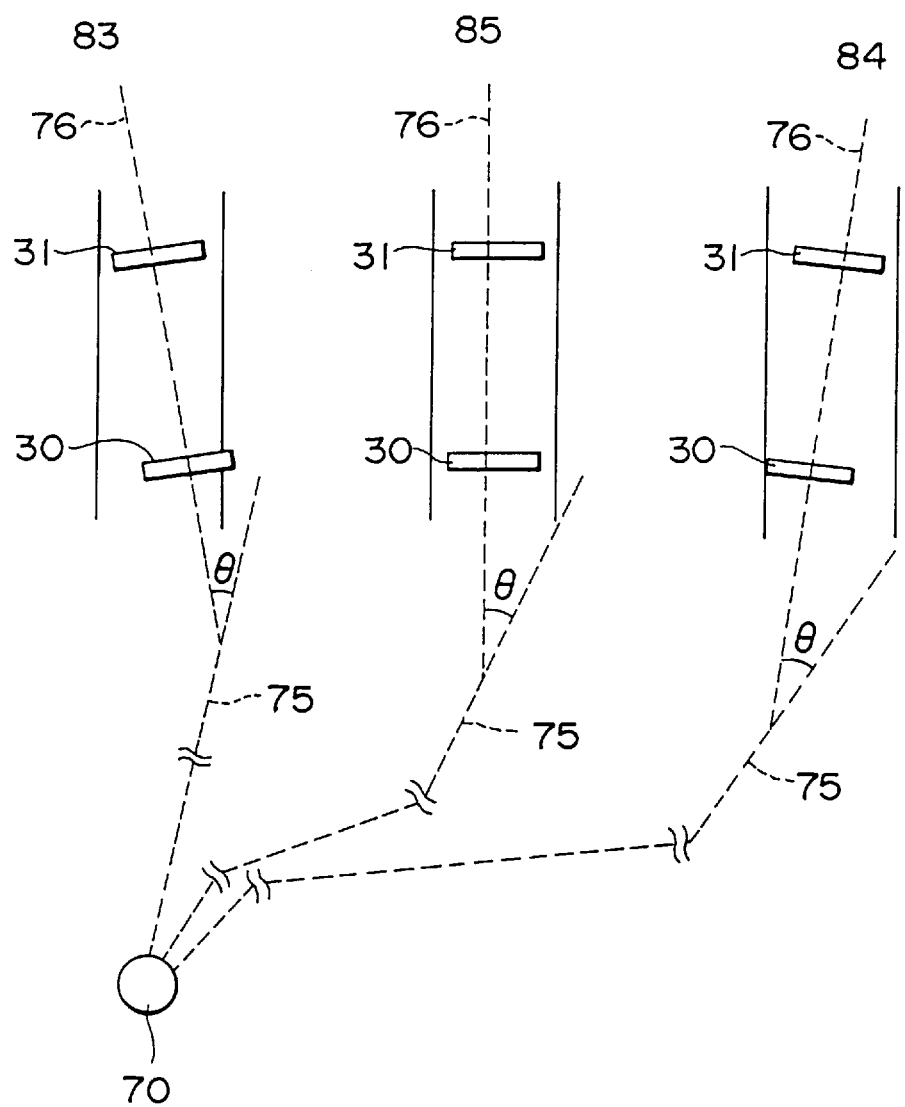

OUTER TRACK

FIG. 21
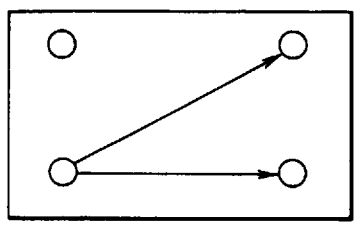
$y_k - y_p > 0$
$y_p \leftarrow y_k$
$\beta \leftarrow +1$
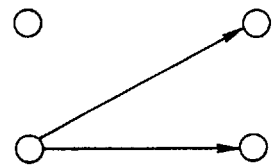
$-2 < y_k - y_p \leq 0$
$y_p \leftarrow y_p$
$\beta \leftarrow \beta$
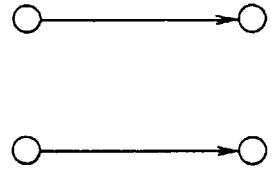
$y_k - y_p \leq -2$
$y_p \leftarrow y_k$
$\beta \leftarrow -1$
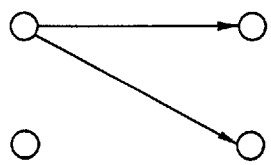

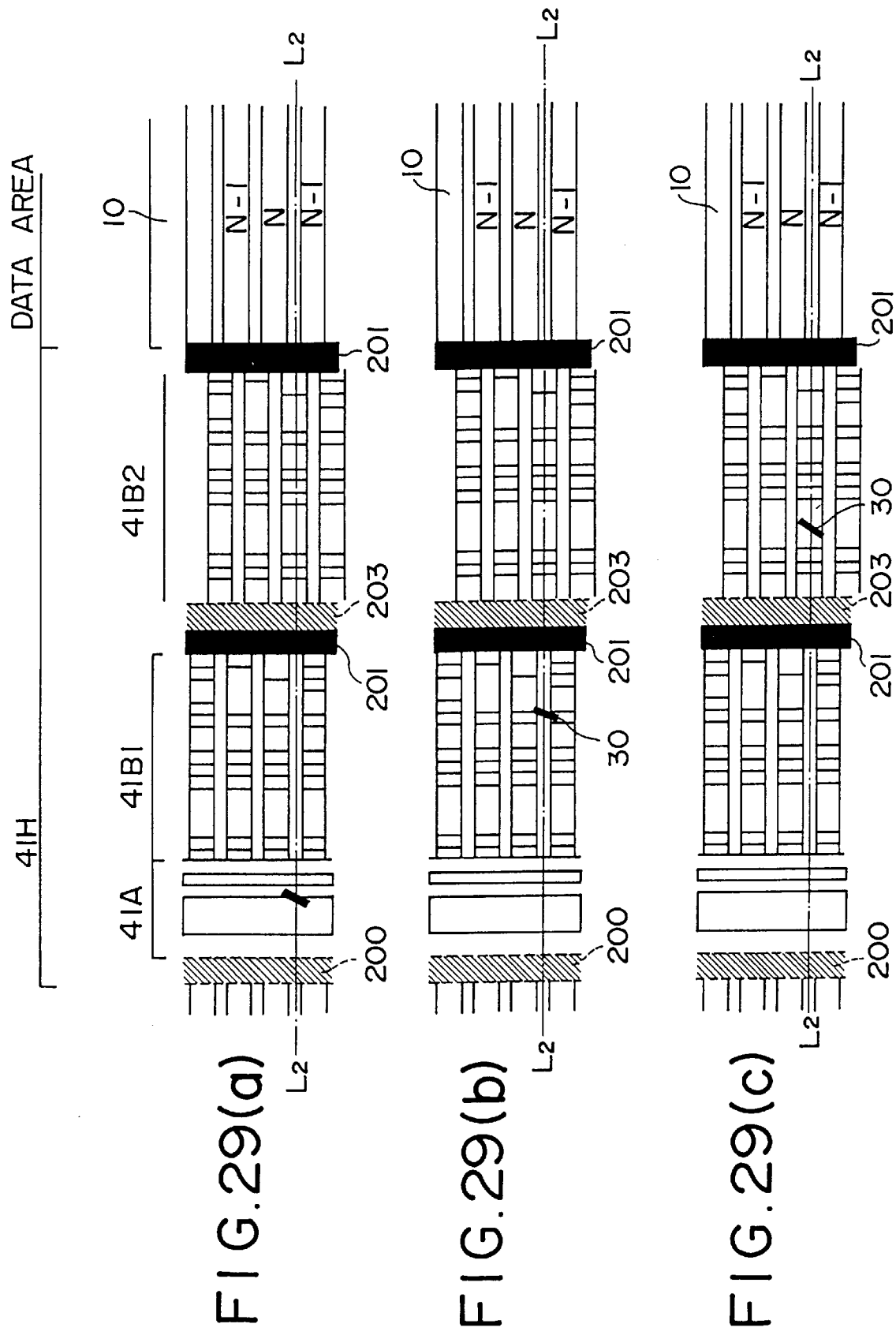

INFORMATION STORAGE DISC AND INFORMATION RECORDING AND REPRODUCING APPARATUS

This application is a continuation of application Ser. No. 08/191,120 filed Feb. 3, 1994 now abandoned.

BACKGROUND OF THE INVENTION

1. Field of the Invention

The present invention relates to an information storage disc practiced illustratively as a magnetic disc or optical disc, as well as to an information recording and reproducing apparatus practiced illustratively as a disc drive unit in a mass storage device for use with a data processing system, the disc and the apparatus being used for recording and reproducing information thereto and therefrom.

2. Description of the Related Art

FIG. 1 is a view showing the positional relations of a read head and a write head with respect to the tracks on a disc in a conventional magnetic disc unit. A rotating arm 2 rotating around an arm axis 1 is equipped with the write head W and the read head R. As arrowed in the figure, the magnetic disc 3 rotates counterclockwise. The read head R is located upstream of the write head W.

The tracks on the magnetic disc 3 are divided into a plurality of sectors. Each sector is split into a servo data storage area and a data storage area. At the beginning of each data storage area is an ID storage area in which a sector number and track numbers are first written by use of the write head W. The read head R reads each sector number and track number. If the location read by the read head R is the desired location (i.e., in the desired sector on the desired track), data is written by the write head W to that region in the data storage area which follows the ID storage area.

As illustrated in FIG. 1, the write head W and read head R are arranged to be positioned in an aligned manner on track 4, the innermost track. That is, on the innermost track 4, the radial distance L1 between the write head W and the read head R is very small (close to 0). As a result, when the write head W is positioned on the outermost track 5, the read head R is displaced or dislodged from the track 5 by a distance L2.

FIG. 2 is an enlarged view of part of what is shown in FIG. 1. The write head W and the read head R are shown to be positioned on the innermost track 4, on the outermost track 5 and on an intermediate track 6. Suppose that the write head W is positioned on a given track. In that case, as illustrated, the farther the track on which the write head W is positioned from the disc center, the greater the dislodged distance of the read head R from that track. Conversely, if the read head R is correctly positioned on the target track, the write head W is dislodged from that track correspondingly.

Generally, to write data on the disc requires positioning the write head W at the center of the target track. With the write head W thus positioned, the center of the read head R is bound to be dislodged from the track center. This can result in a failure to read such ID information as sector and track numbers accurately.

SUMMARY OF THE INVENTION

It is therefore an object of the present invention to overcome the above deficiencies and disadvantages of the prior art and to provide an information storage disc and an information recording and reproducing apparatus for improving on the prior art.

In carrying out the invention and according to one aspect thereof, there is provided an information storage disc having tracks divided into a plurality of sectors, each of the sectors being divided into a servo data area for storing servo data and a data storage area for storing written data; wherein the data storage area has an ID storage area previously formed therein in the radial direction of the disc, the ID storage area storing either sector numbers or track numbers, the sector numbers designating the sectors, the track numbers designating the tracks; and wherein the ID storage area has either the sector numbers or the track numbers recorded therein previously and magnetically, the recording of the numbers being accomplished through magnetic field reversal in the same direction.

According to another aspect of the invention, there is provided an information recording and reproducing apparatus for writing and reading data to and from an information storage disc having tracks divided into a plurality of sectors, each of the sectors being divided into a servo data area for storing servo data and a data storage area for storing written data, the data storage area having an ID storage area previously formed therein in the radial direction of the disc, the ID storage area storing either sector numbers or track numbers, the sector numbers designating the sectors, the track numbers designating the tracks, the ID storage area having either the sector numbers or the track numbers recorded therein previously and magnetically, the recording of the numbers being accomplished through magnetic field reversal in the same direction, the information recording and reproducing apparatus comprising: a write head for writing information to the tracks; a read head for reading information from the tracks, the read head being separated from the write head by a predetermined distance in the direction of the tracks; a rotating arm rotated on a suitable axis; an arm driving circuit for driving the rotating arm; and data detecting means for detecting data using a read signal read by the read head, wherein the write head and the read head are attached to the rotating arm so as to be positioned in a substantially aligned manner on the innermost track and on the outermost track of the information storage disc.

The information storage disc of the invention has ID storage areas formed in predetermined locations in the radial direction of the disc, the ID storage areas storing sector or track numbers previously and magnetically. In this setup, even if the read head is dislodged from the center line of a given track, the read head can read the sector number without fail.

The information recording and reproducing apparatus of the invention has the read head and the write head arranged so that they are positioned on a given intermediate track in a substantially aligned manner. Thus with the write head positioned on a given track, the read head is dislodged from that track only by a negligible distance. This allows the read head to read sector and track numbers unfailingly from the disc.

Other objects, features and advantages of the present invention will become apparent in the following specification and accompanying drawings.

BRIEF DESCRIPTION OF THE DRAWINGS

FIG. 13 is a view sketching the positional relations of the read head 30 and write head 31 shown in FIG. 11 to tracks on a disc;

FIG. 21 is a view for explaining the Viterbi algorithm;

FIGS. 29(a) through 29(c) are views depicting how ID information is read for write operations in connection with the tenth embodiment.

DESCRIPTION OF THE PREFERRED EMBODIMENTS

First Embodiment

Figure 3:
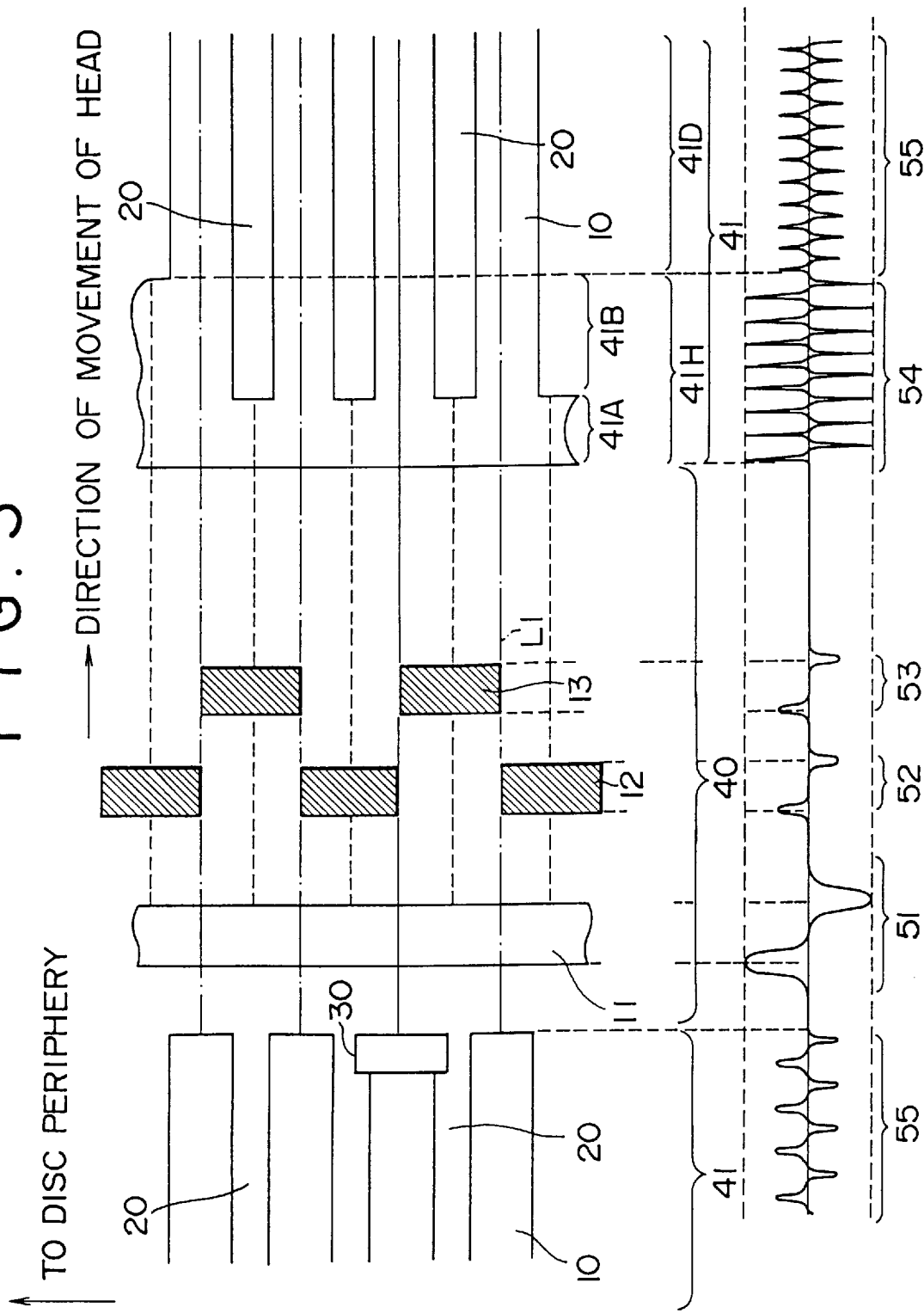
FIG. 3 is a view depicting formats of a servo data storage area 40 and a data storage area 41 on an information storage disc practiced as a first embodiment of the invention.

FIG. 3 depicts formats of various areas on an information storage disc practiced as a first embodiment of the invention. On the disc as the first embodiment, a plurality of tracks are formed in a concentric or spiral manner, each track being divided into a plurality of sectors. The disc is rotated at a constant angular velocity (CAV).

As shown in FIG. 3, each sector is divided into a servo data storage area 40 and a data storage area 41. The servo data storage area 40 has a clock mark 11 and wobble marks 12 and 13 formed and recorded therein.

The clock mark 11 is a mark permitting the generation of a clock signal that provides the reference for write and read operations to and from the disc. A read head 30, upon reading the clock mark 11, outputs a timing signal 51 corresponding to the edges of the mark. As depicted in FIG. 3, the clock mark 11 is provided not only on data tracks 10 but also in the regions between tracks 10. That is, the clock marks 11 are formed continuously and in the radial direction of the disc.

The wobble marks 12 and 13 are staggered across the center line L1 of each track 10 on the inner and the outer sides; the marks are also separated by a predetermined distance along the tracks. On reading the wobble marks 12 and 13, the read head 30 outputs position pulses 52 and 53 which correspond to the edges of the marks. When tracking servo is executed so as to match the position pulses 52 and 53 in level, the read head 30 is positioned on the center line L1 of a given track 10.

At the beginning of the data storage area 41 is an ID storage area 41H. The ID storage area 41H is followed by an area 41D to and from which data is written and read.

The ID storage area 41H is divided into a sector number storage area 41A and a track number storage area 41B. At least the sector number storage area 41A is formed, as with the clock marks 11, continuously and in the radial direction on and between the tracks 10. The sector number storage area 41A stores the sector number designating the sector, and the track number storage area 41B stores the track numbers designating the tracks. The read head 30 outputs a pulse train 54 upon reading the ID storage area 41H.

Figure 4:
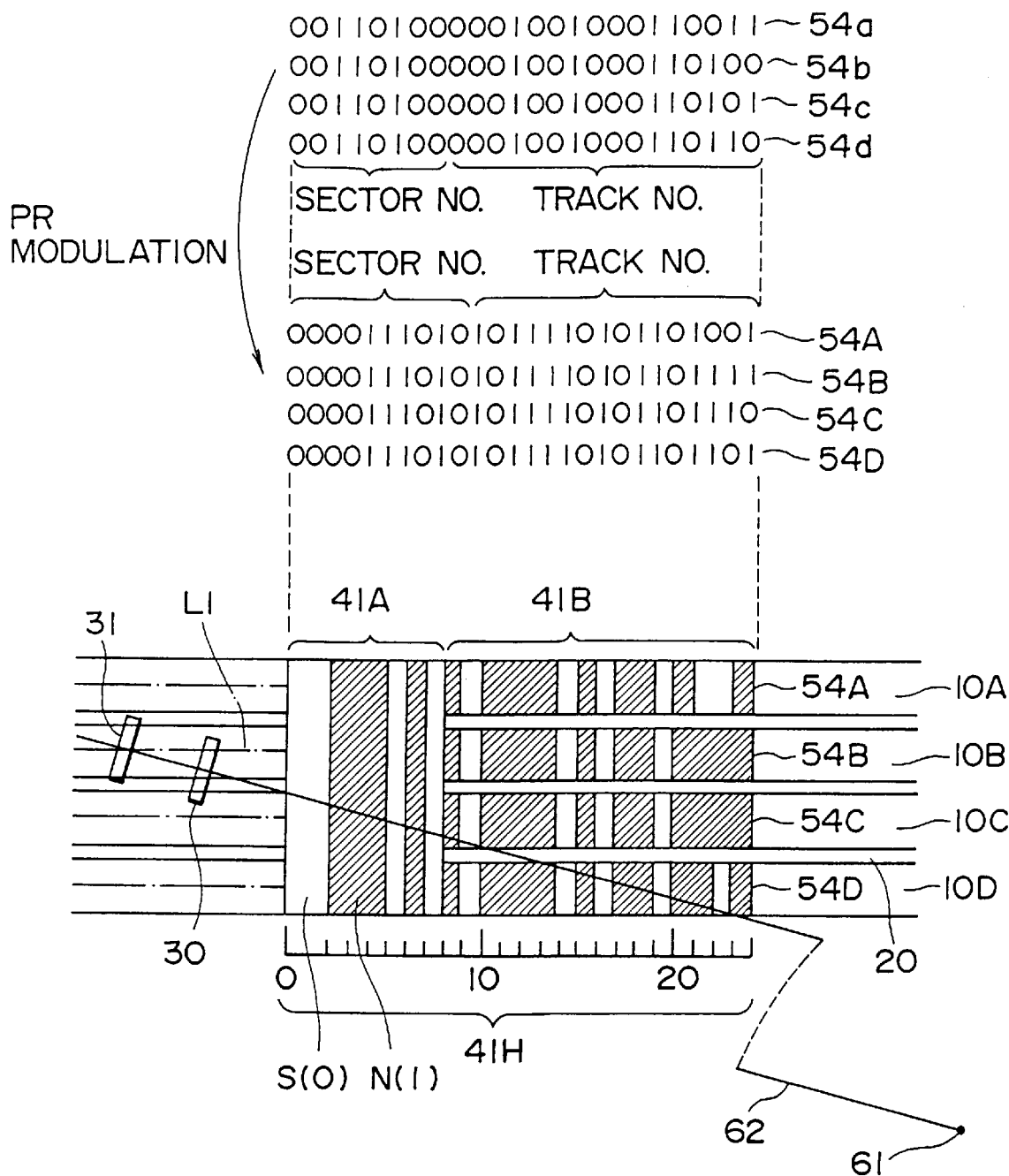
FIG. 4 is an enlarged view of an ID storage area 41H included in FIG. 3.

FIG. 4 is an enlarged view of the sector number storage area 41A and track number storage area 41B. As illustrated, eight-bit sector numbers and 16-bit track numbers constitute 24-bit data stored as ID data in the ID storage area 41H. In FIG. 4, reference numerals 54a through 54d indicate the ID data of sector 52 stored on tracks 1233 through 1236. The high-order eight bits represent the sector number (52) and the low-order 16-bits denote the track numbers (1233–1236).

The ID data 54a through 54d are subjected to PR (partial response) modulation (−1, 0, 1) for conversion to ID data 54A through 54D. The ID data 54A through 54D are stored in the ID storage area 41H ranging from track 1233 to track 1236, i.e., on track 10A through track 10D.

The sector number is the same for the innermost through the outermost tracks. The sector number is recorded not only on the tracks 10A through 10D but also stored continuously in the regions between the tracks. In the track number storage area 41B, a guard band 20 is formed between every two adjacent tracks. The guard bands 20 are likewise furnished in the area 41D. Illustratively, the guard bands 20 are formed in concave fashion and made lower than the data tracks 10 by 200 nm. The guard bands constitute regions which are provided to prevent cross talk and in which no data is recorded. The structure involving the guard bands 20 formed in concave fashion with respect to the tracks 10 is disclosed illustratively in Japanese Patent Application No. 271731/1992 (filed on Oct. 9, 1992).

The ID storage area 41H described above is followed by the area 41D, as shown in FIG. 3. The write head 31 (FIG. 4) writes data to the area 41D. The data thus written is read by the read head 30 which outputs a data train 55. The hatched regions in FIG. 4 are magnetized in one polarity (N) to represent logic 1; those not hatched are magnetized in the opposite polarity (S) to reflect logic 0.

Where the ID storage area 41H is structured as described, the magnetic heads (write head 31 and read head 30) are positioned by the method disclosed illustratively in Japanese Patent Application No. 275724/1991 (laid-open No. 5-114259; laid open on May 7, 1993) and in U.S. patent application Ser. No. 958,949 (filed on Oct. 9, 1992). Briefly, the disclosed method for positioning of the magnetic heads is as follows: in read mode, tracking servo is executed so that the position pulses 52 and 53 will match in level, the pulses 52 and 53 corresponding to the wobble marks 12 and 13 of FIG. 3 when output. This causes the center of the read head 30 to be positioned on the center line L1 of a track 10. At this point, the read head 30 reads not only the servo data from the servo data storage area 40 but also the data from the data storage area 41.

In write mode, a tracking error signal appropriately offset is used to carry out tracking servo so that the center of the write head 31 will come onto the center line L1 of the track 10. At this point, the read head 30 which is attached, together with the write head 31, to an arm 62 rotating around its axis of rotation 61 is dislodged slightly from the center of the track 10. But since the sector number storage area 41A has the sector number stored not only on the tracks but also between the tracks, the read head 30 reads the sector number unfailingly. The track numbers, on their part, are constituted by bits of mostly the same patterns. This allows the read head 30, even though slightly dislodged from the track center, to read the high-order bits of the track numbers correctly.

Second Embodiment

Figure 6:
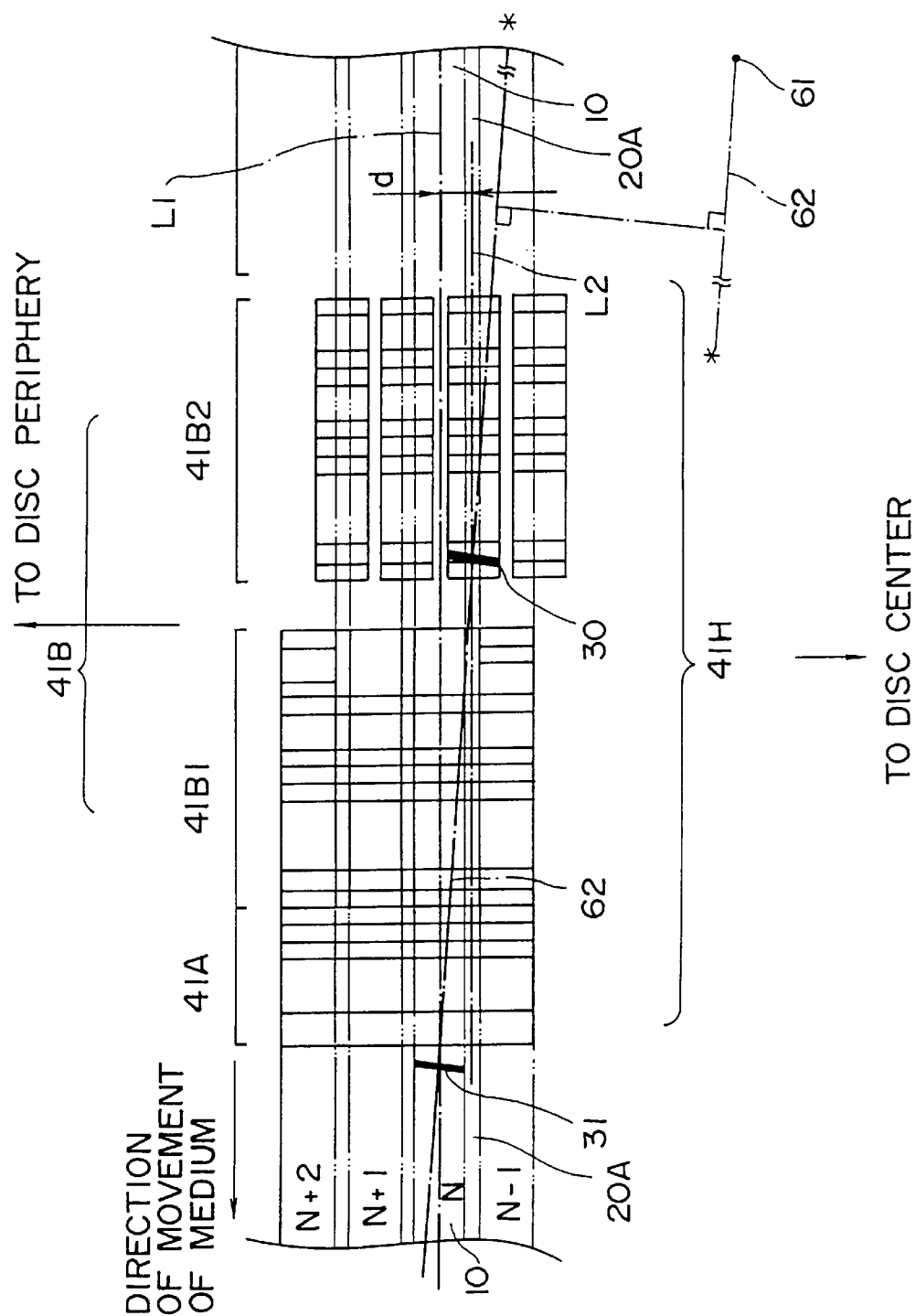
FIG. 6 is a view showing a format of an ID storage area 41H of an information storage disc practiced as a second embodiment of the invention.

FIG. 6 shows an ID storage area format of an information storage disc practiced as a second embodiment of the invention. Whereas the first embodiment shown in FIGS. 3 and 4 does not always read the low-order bits of the track numbers correctly, the second embodiment envisages overcoming this drawback. The disc practiced as the second embodiment has the track number storage area 41B divided into a read operation track number storage area 41B1 and a write operation track number storage area 41B2, as depicted in FIG. 6.

The read operation track number storage area 41B1 is formed so that its center (in the width direction) will be on the center line L1 of the track 10. The write operation track number storage area 41B2 is formed so that its center line L2 will be located away from the center line L1 of the track 10 by a distance d (i.e., offset in position). The read operation track number storage areas 41B1 and the write operation track number storage areas 41B2 store the same track numbers.

Figure 5:
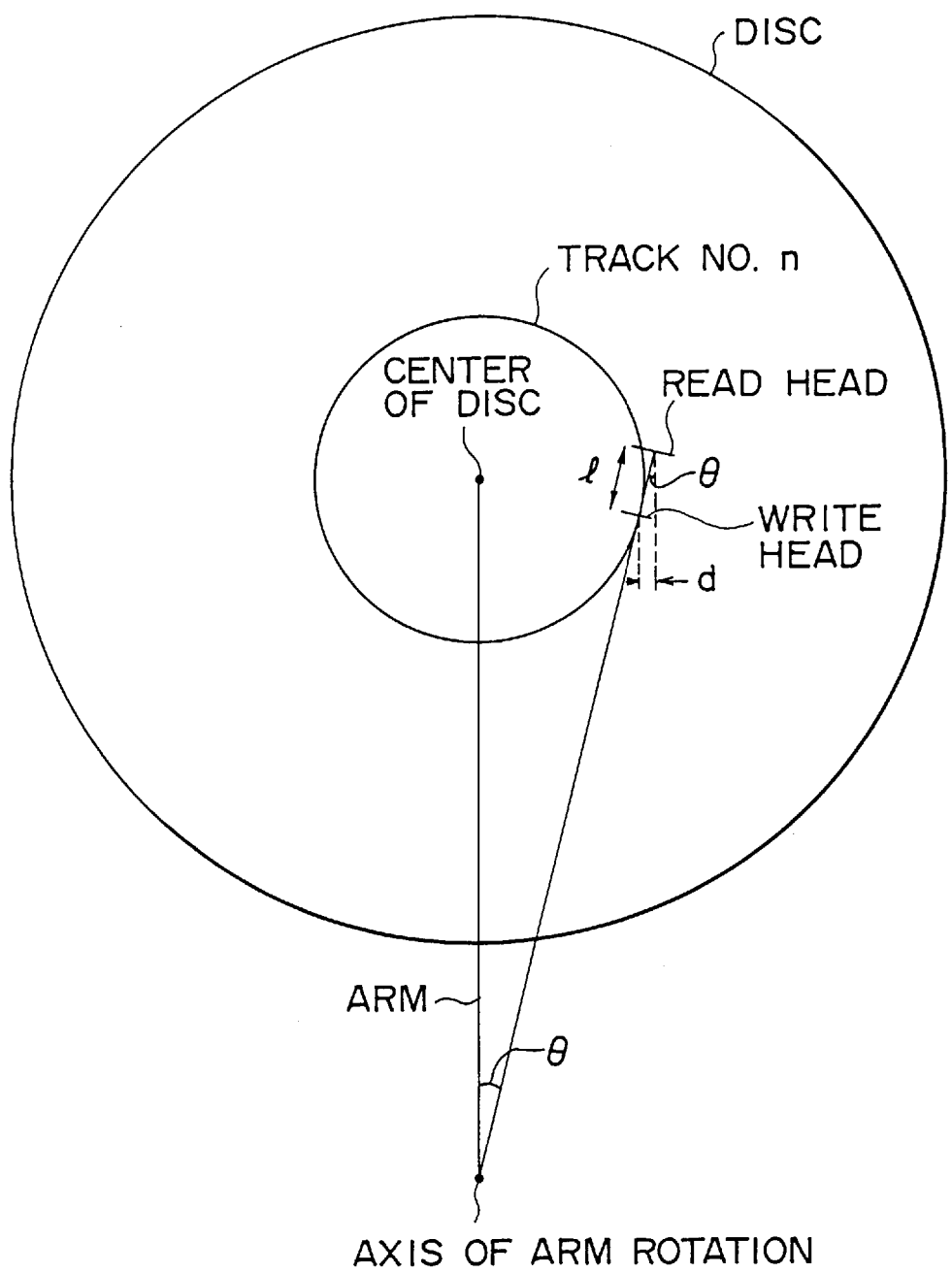
FIG. 5 is a view illustrating the distance between the gap center of a write head and that of a read head.

The offset value d of a given write operation track number storage area 41B2 is the smallest for the innermost track and the largest for the outermost track. More specifically, as shown in FIG. 5, the offset value d is given by the following expression:

$$d = l \times \sin\theta = l \times \sin(\theta_T \times n)$$

where, l stands for the distance between the gap center of the write head and that of the read head; $\theta$ for the angle formed between the rotating arm on the one hand, and a straight line connecting the axis of arm rotation and the disc center on the other; N for the number of all tracks ranging from the disc center to the outermost track; n (0–N) for the number of feed tracks; and $\theta_T$ for the arm feed angle per track. On a 2.5-inch disc, for example, tan $\theta_T$ is 0.125 mrad (1 rad=60°).

The other structural aspects of the second embodiment are the same as those of the first embodiment in FIGS. 3 and 4. It should be noted that the guard bands 20A are formed flush with the track 10; they are not formed in concave fashion as in the case of the first embodiment.

The above ID patterns are written on the disc illustratively as follows: as with the first embodiment, the wobble marks 12 and 13 are used to control the write head 31 so that the head center will come onto the center line L1 of the track 10. As disclosed illustratively in Japanese Patent Laid-Open No. 187073/1991 (laid open on Aug. 15, 1991) and in U.S. patent application Ser. No. 62,548 (filed on Dec. 11, 1990), the amounts of divergence from the center of the write head 31 and from the read head 30 may be measured or calculated beforehand and stored. The amounts are translated into appropriate offsets that are added to the tracking error signal which is then used to control the write head 31.

When positioned in the above manner, the write head 31 writes a sector number and a track number respectively to the sector number storage area 41A and the read operation track number storage area 41B1. During this write operation, the write head 41 simply moves past the write operation track number storage area 41B2. The locations to which to write the numbers are determined precisely with reference to the clock mark 11.

Then the offset amount added to the tracking error signal is increased so that the center of the write head 31 will scan the center line L2 of the write operation track number storage area 41B2. In this state, the write head 31 writes the track number to the write operation track number storage area 41B2. Here, the write head 31 simply moves past the sector number storage area 41A and the read operation track number storage area 41B1.

The operation in read mode with the second embodiment is the same as with the first embodiment. That is, an appropriate offset amount is added to the tracking error signal so that the center of the read head 30 will trace the center line L1 of the track 10. Referencing the sector number storage area 41A and read operation track number storage area 41B1, the read head 30 reproduces the sector number and the track number unfailingly.

In write mode, as shown in FIG. 6, an appropriate amount of offset is added to the tracking error signal so that the center of the write head 31 will trace the center line L1 of the track 10 (while the center of the read head 30 is tracing the center line L2). The read head 30 reads the sector number from the sector number storage area 41A. Since the sector number storage area 41A is formed continuously in the radial direction of the disc as described, the read head 30 reads the sector number correctly even if the head is tracing a location offset from the track center line L1.

While the read head 30 is tracing the read operation track number storage area 41B1, the actual read operation is suppressed by muting the read signal or by resorting to other appropriate measures. The read head 30 then reads the track number from the write operation track number storage area 41B2. The track number is read accurately by the read head 30 because the write operation track number storage area 41B2 is offset by the distance d from the track 10.

When the sector number and track number thus read are found to correspond to the appropriate numbers, the write head 31 writes the target data to the area 41D on the track 10 during tracing thereof.

Third Embodiment

Figure 7:
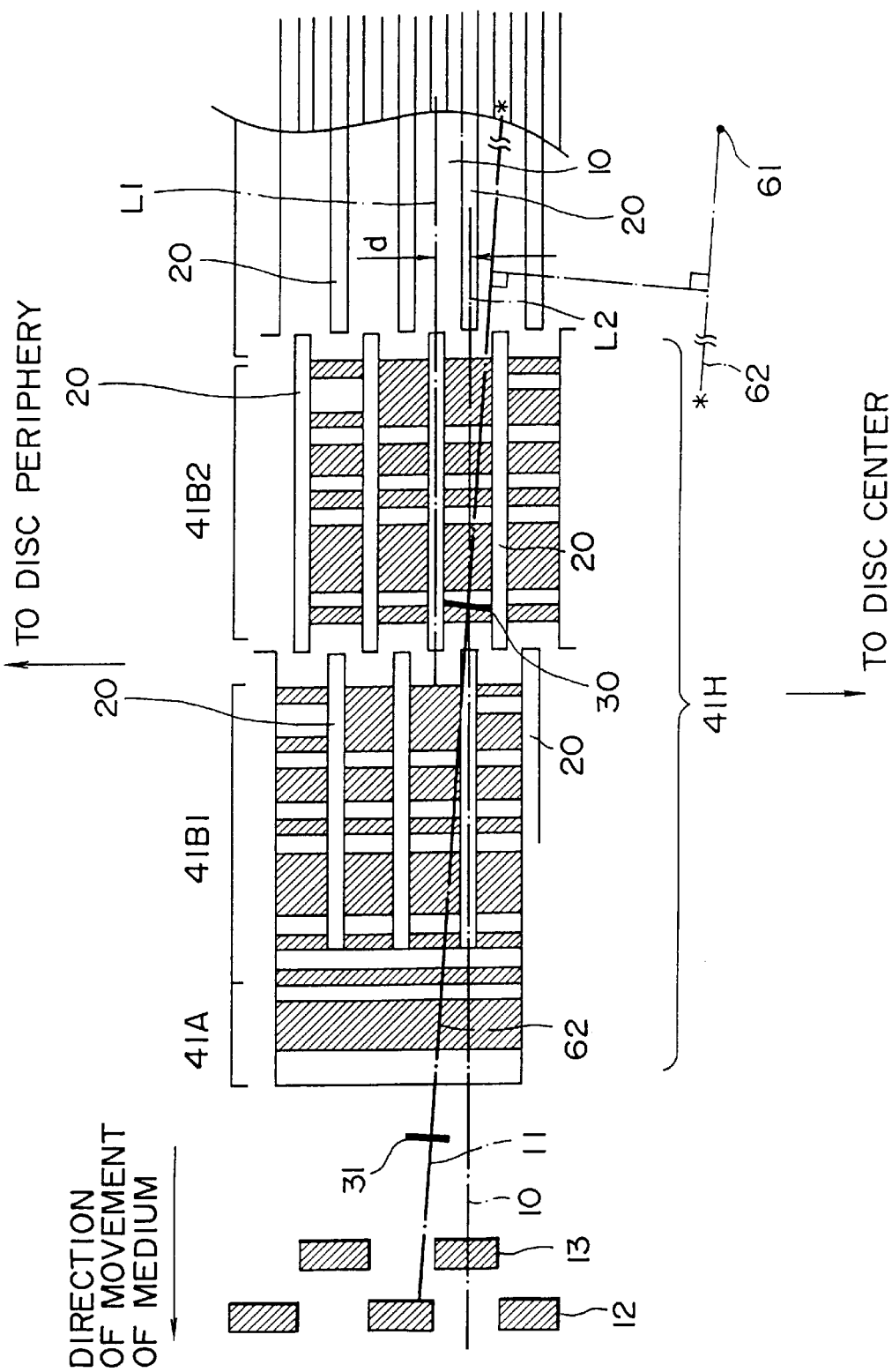
FIG. 7 is a view sketching a format of an ID storage area 41H of an information storage disc practiced as a third embodiment of the invention.

FIG. 7 sketches an ID storage area format of an information storage disc practiced as a third embodiment of the invention. The third embodiment is basically the same in constitution as the second embodiment of FIG. 6. The difference is that unlike the guard bands 20A of the second embodiment, the guard bands 20 of the third embodiment are formed in concave fashion and made lower than the tracks 10. As such, the guard bands 20 do not admit the writing of data by the write head 31. The guard bands 20 thus act as "active" guard bands. The disc of this format may illustratively be manufactured using the method disclosed in Japanese Patent Application No. 271731/1992 (filed on Oct. 9, 1992).

With the third embodiment, the width of a guard band 20 and that of a track 10 are each formed to be an integer multiple of the width of a groove formed by a cutting machine scanning once with a laser beam the surface of a photo-resist-coated disc original. The guard band 20 has the same width as that formed by a single laser beam scan; the track 10 has the width corresponding to that formed by three laser beam scans (i.e., three times the width of the guard band 20).

That is, a guard band 20 is formed by irradiating an appropriately timed laser beam onto the disc original as the latter completes a single turn. The irradiation of the laser beam is then suspended while the disc original completes another three turns. The process is repeated to form the guard bands 20 and the tracks 10, each of the latter being three times as wide as each of the former.

With the third embodiment, irradiating the laser beam with a proper timing forms the clock mark 11, the wobble marks 12 and 13, the sector number storage area 41A, the track number storage area 41B (with the read operation track number storage area 41B1 and write operation track number storage area 41B2) and the area 41D. The positions of the areas thus formed are controlled very accurately.

The photo resist on the disc original following exposure to laser beam irradiation is developed, and the exposed parts (e.g., guard bands 20) are removed to form the corresponding grooves on the disc. A stamper is then produced from this disc original. The stamper is used to manufacture a large number of replicas on which magnetic films are furnished in predetermined locations. This is how magnetic discs of the third embodiment are manufactured, its format being shown in FIG. 7.

Experiments revealed that giving the disc original a total of 26 turns illustratively at a pitch of 0.2 μm formed the tracks 10 precisely to a width of 5.2 μm, along with the guard bands 20 of a different width therebetween. Under this production scheme, the tracks including the ID storage area 41H were formed with very high precision (with a resolution of 0.05 μm). Thus with the write head 31 and read head 30 positioned in the same manner as with the second embodiment of FIG. 6, the sector number and the track number are read precisely from the third embodiment. The read operation involved is the same as that of the second embodiment and will not be discussed further.

Fourth Embodiment

For the second embodiment of FIG. 6 and the third embodiment of FIG. 7, an appropriate offset amount is added to the tracking error signal in write mode so that the read head 30 will scan the center line L2 of the write operation track number storage area 41B2. This in turn allows the write head 31 to scan the center line L1 of the track 10.

Figure 8:
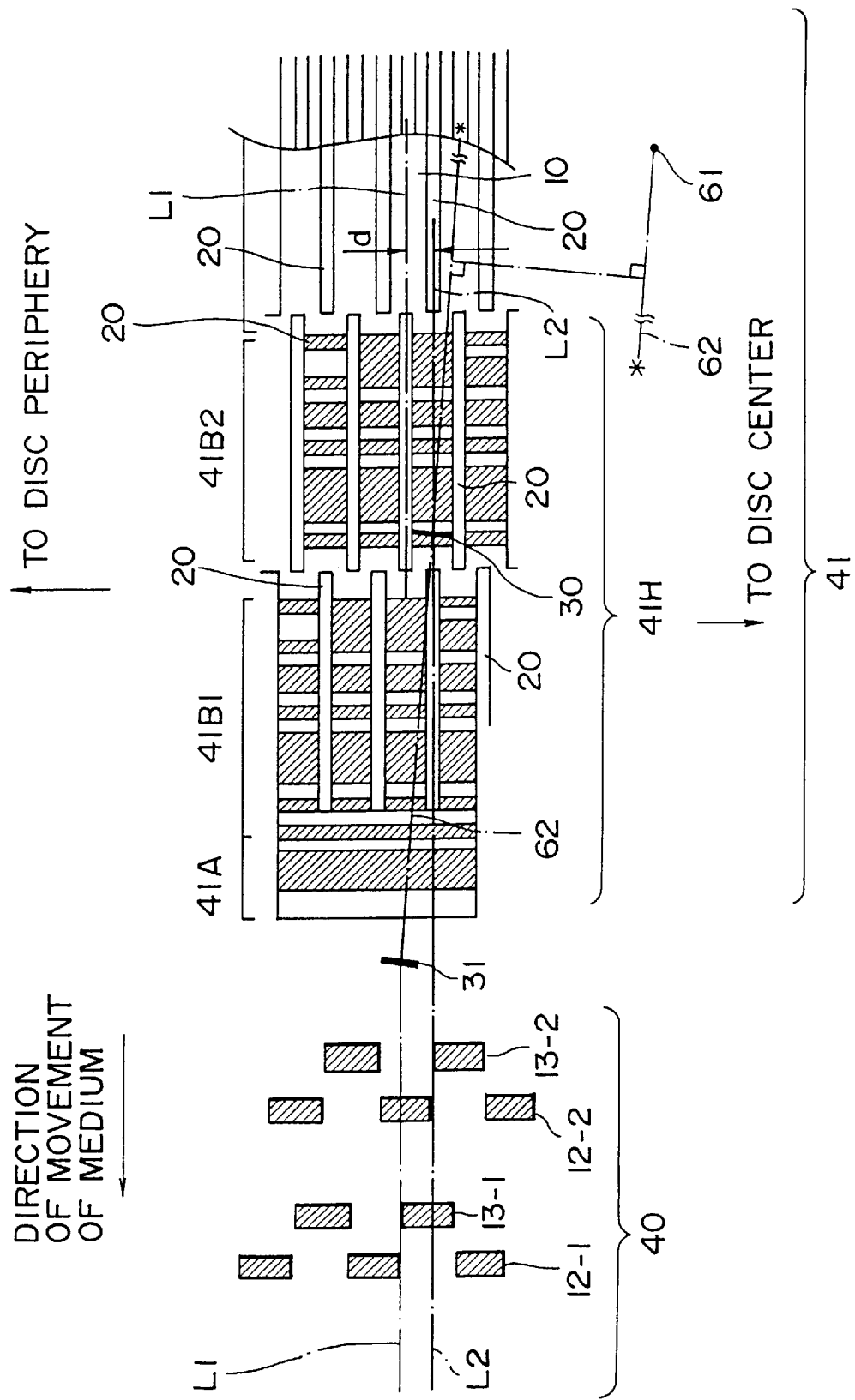
FIG. 8 is a view portraying a format of an ID storage area 41H of an information storage disc practiced as a fourth embodiment of the invention.

To execute control of the above nature requires altering the offset amount in accordance with the target radial position on the disc, as mentioned earlier. This makes it relatively difficult to position the head accurately. The fourth embodiment envisages eliminating this drawback. As shown in FIG. 8, the information storage disc practiced as the fourth embodiment of the invention has wobble marks 12-1 and 13-1 (corresponding to the wobble marks 12 and 13 of the third embodiment of FIG. 7) which are used to position the read head 30 onto the center line L1 of a given track 10 (comprising the sector number storage area 41A and the read operation track number storage area 41B1). The fourth embodiment also has wobble marks 12-2 and 13-2 formed in the servo data storage area 40, the wobble marks being used to let the read head 30 trace the center line of the write operation track number storage area 41B2.

With the fourth embodiment in read mode, the read head 30 is subjected to tracking control in reference to the wobble marks 12-1 and 13-1. This causes the read head 30 to scan the center line L1 of the track 10. In write mode, the read head 30 is subjected to tracking control using the tracking error signal obtained by the read head 30 reading the wobble marks 12-2 and 13-2. This allows the read head 30 to scan the center line L2 of the write operation track number storage area 41B2.

Figure 9:
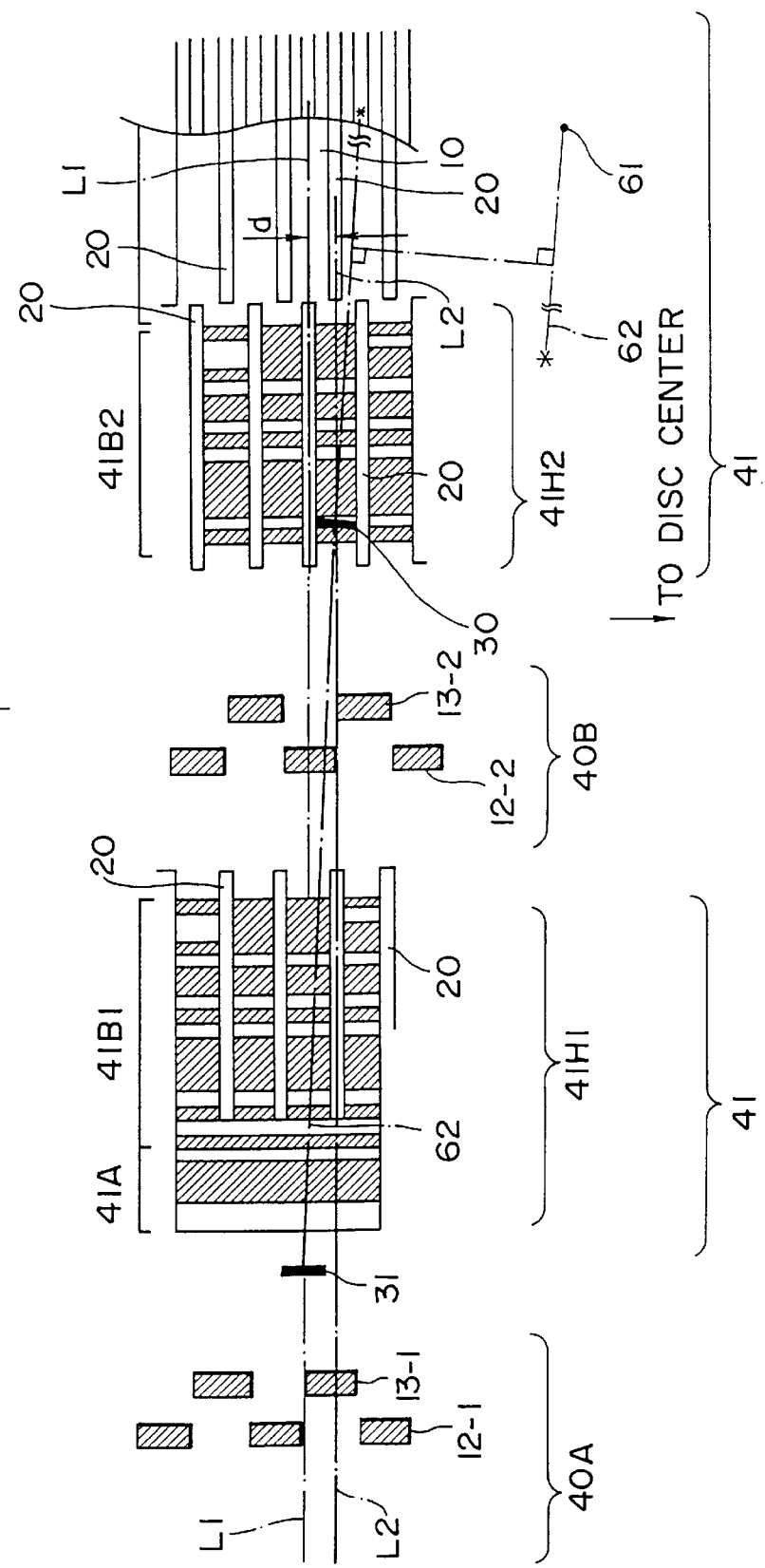
FIG. 9 is a view illustrating another format of the ID storage area 41H of the fourth embodiment.

With the fourth embodiment of the above constitution, the ID storage area comprises the wobble marks 12-1 and 13-1, the offset wobble marks 12-2 and 13-2, the sector number storage area 41A, the read operation track number storage area 41B1, the write operation track number storage area 41B2 and the area 41D, in that order. Alternatively, as shown in FIG. 9, the fourth embodiment may contain repetitions of a first and a second group of areas: the first group comprising the wobble marks 12-1 and 13-1, the sector number storage area 41B, the read operation track number storage area 41B1 and an area 41D1; the second group having the offset wobble marks 12-2 and 13-2, an offset write operation track number storage area 41B2 and an area 41D2.

Fifth Embodiment

The first through the fourth embodiments are each an information storage disc having an ID storage area format adapted to more precise reading of data from the disc. Alternatively, the read head 30 and write head 31 of the information recording and reproducing apparatus may be arranged so as to ensure more accurate reading of data from the disc.

Figure 10:
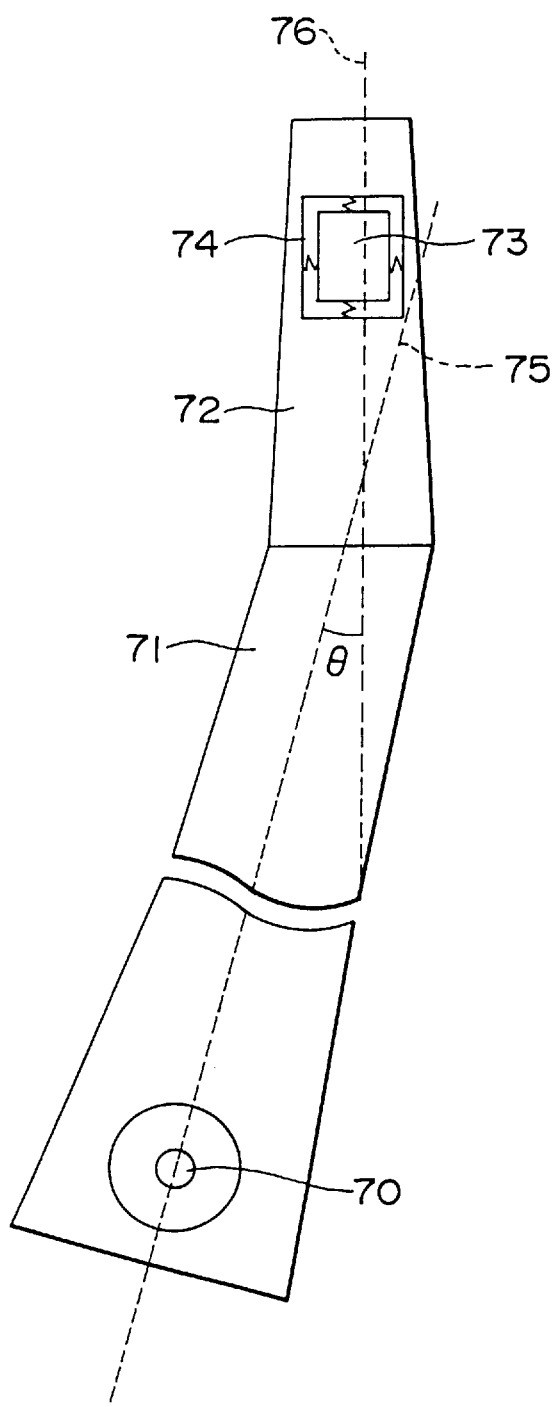
FIG. 10 is a plan view showing the positional relationship between an arm 71 and a suspension 72 of an information recording and reproducing apparatus practiced as a fifth embodiment of the invention.

FIG. 10 shows the positional relationship between an arm 71 and a suspension 72 of an information recording and reproducing apparatus practiced as a fifth embodiment of the invention. In the fifth embodiment, the arm 71 rotates around an arm axis 70 (corresponding to the axis of rotation 61 in FIGS. 4 through 8). The arm 71 is equipped with the suspension 72 to which a slider 73 is attached via springs 74.

Figure 11:
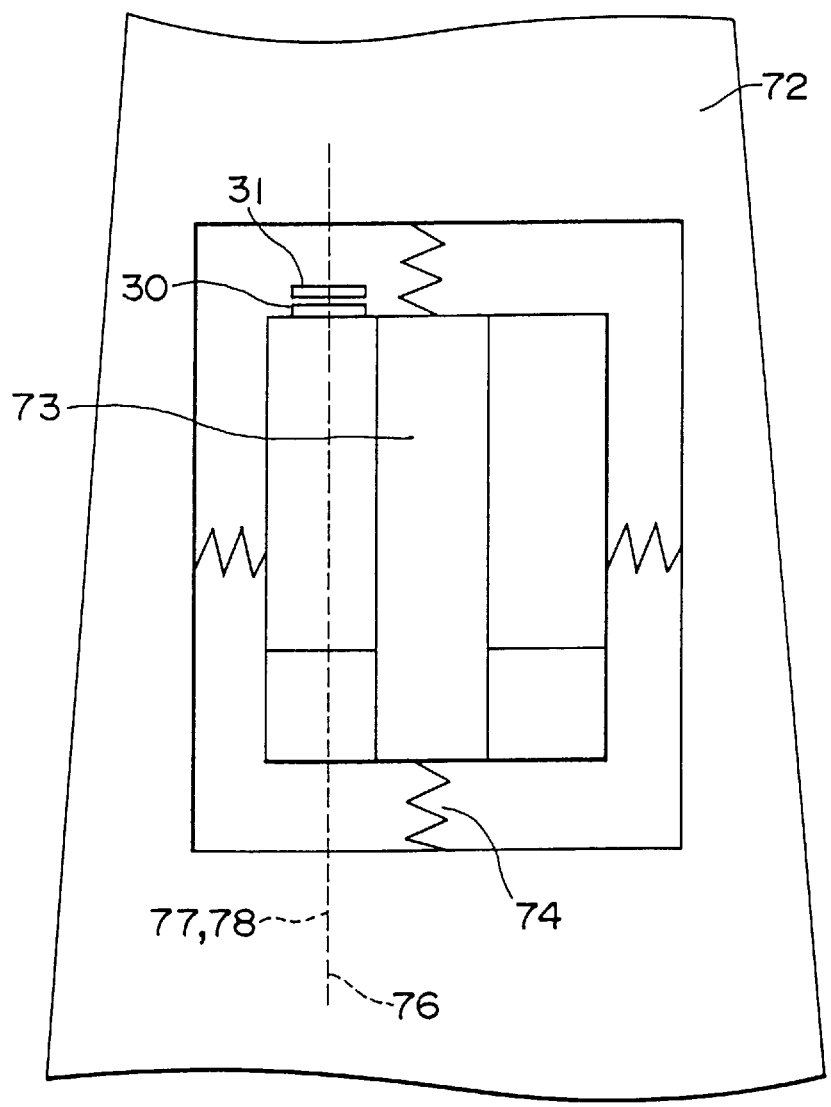
FIG. 11 is a bottom view of a slider 73 included in FIG. 10.

FIG. 11 is a bottom view of the slider 73 in FIG. 10. The read head 30 and write head 31 are mounted on the slider 73 as illustrated. The gap center line 77 of the read head 30 and the gap center line 78 of the write head 31 are aligned with the center line 76 connecting the gap center of the read head 30 to that of the write head 31. The suspension 72 is attached to the arm 71 so that the center line 76 will intersect the center line 75 of the arm 71 at an angle θ.

Figure 12:
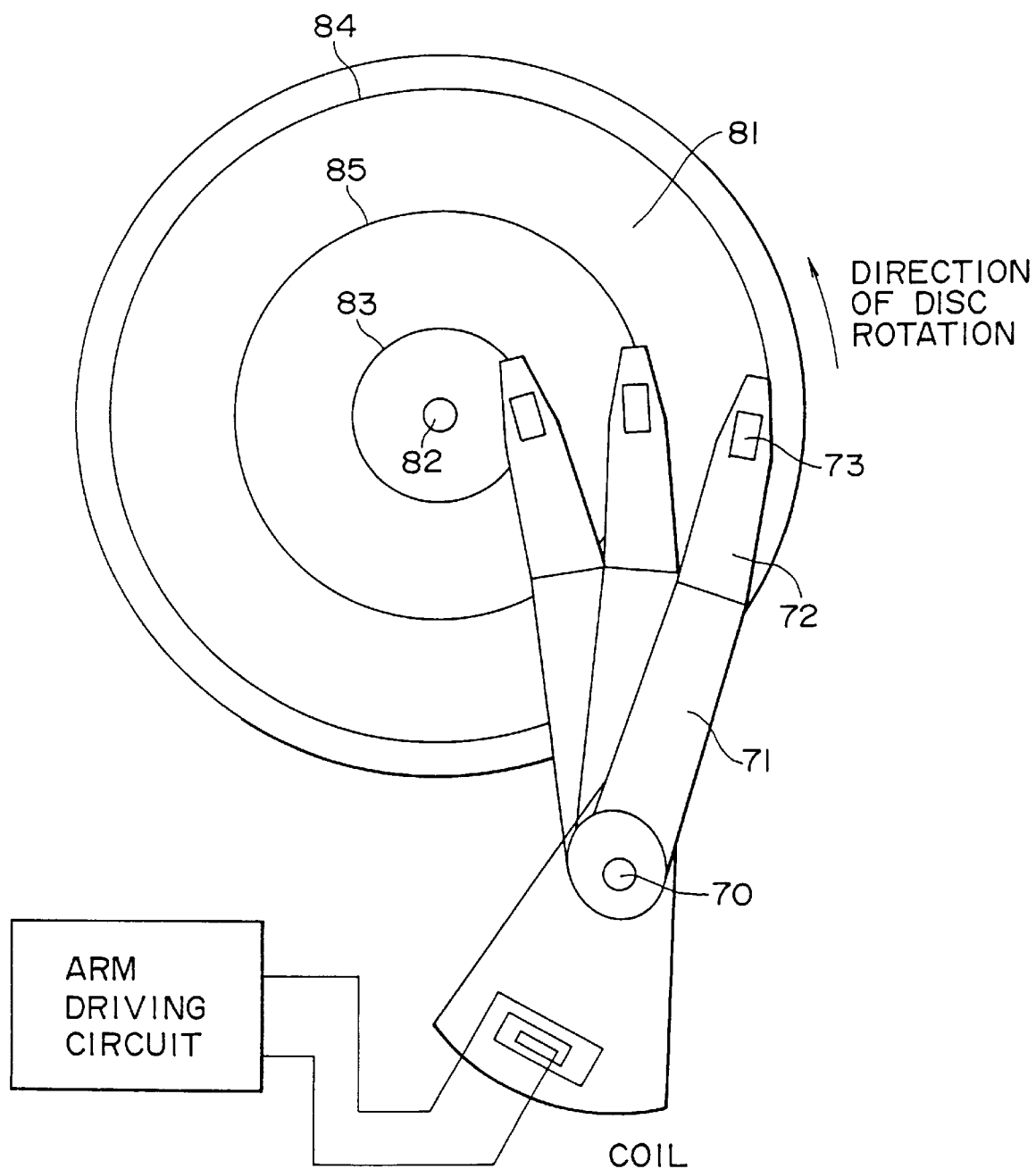
FIG. 12 is a plan view depicting the positional relationship between the arm 71 in FIG. 10 and a disc 81.

The angle θ is determined as follows: as shown in FIG. 12, a tangent to an intermediate track 85 is drawn perpendicularly to the radius drawn from the disc center 82, the intermediate track 85 being located in the middle between the innermost track 83 and the outermost track 84 on the disc 81. The center line 76 is made to coincide with the tangent when viewed from above. In this state, the angle formed between the tangent and the center line 75 of the arm 71 is the angle θ. In an enlarged view of FIG. 13, the write head 31 and the read head 30 are both positioned on the intermediate track 85 that is in the middle between the innermost track 83 and the outermost track 84. In other words, the center line 76 is substantially in parallel with the intermediate track 85.

Figure 1:
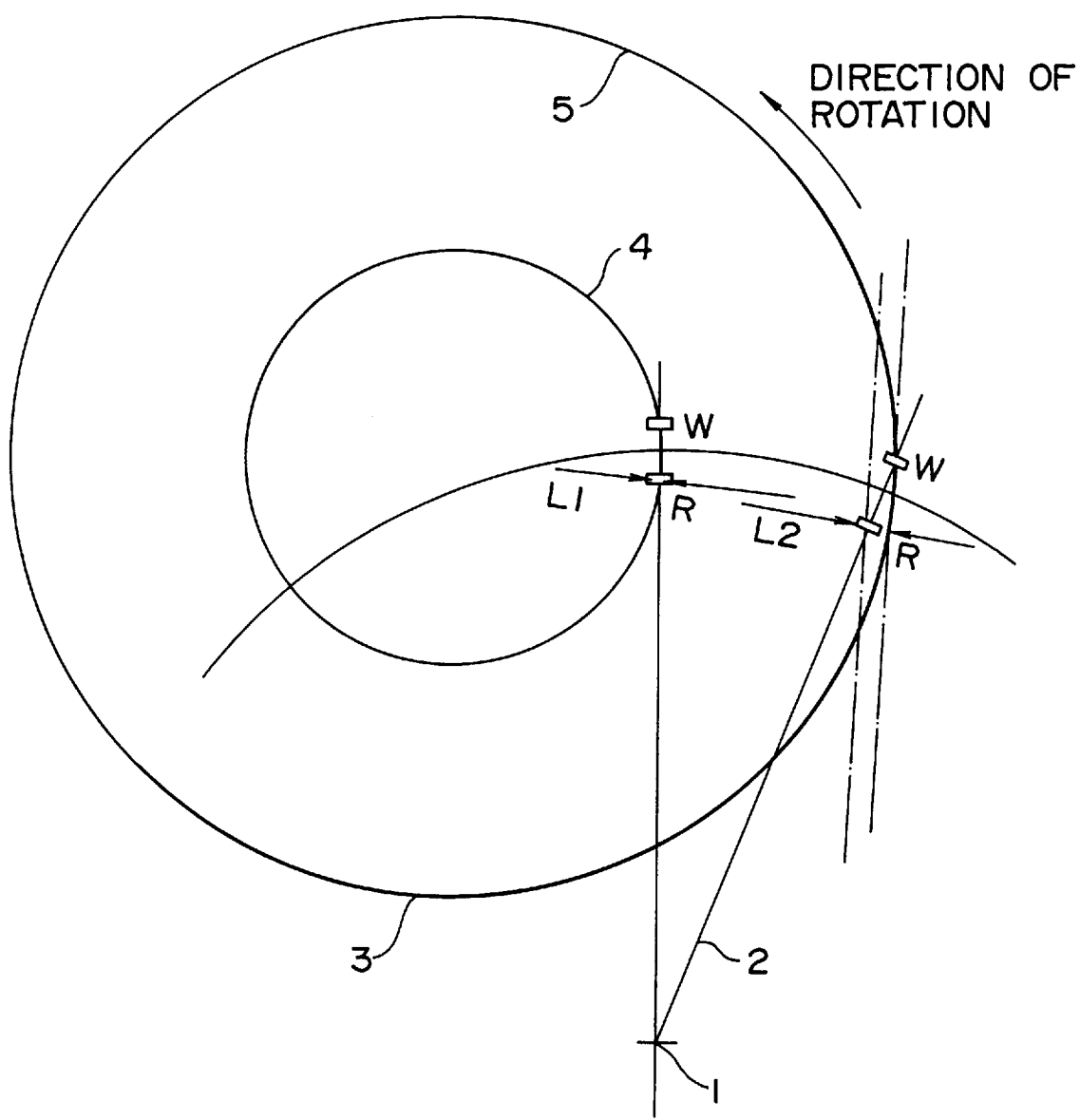
FIG. 1 is a view showing the positional relations of a read head and a write head of an information recording and reproducing apparatus with respect to the tracks on a disc in a conventional magnetic disc unit.
Figure 2:
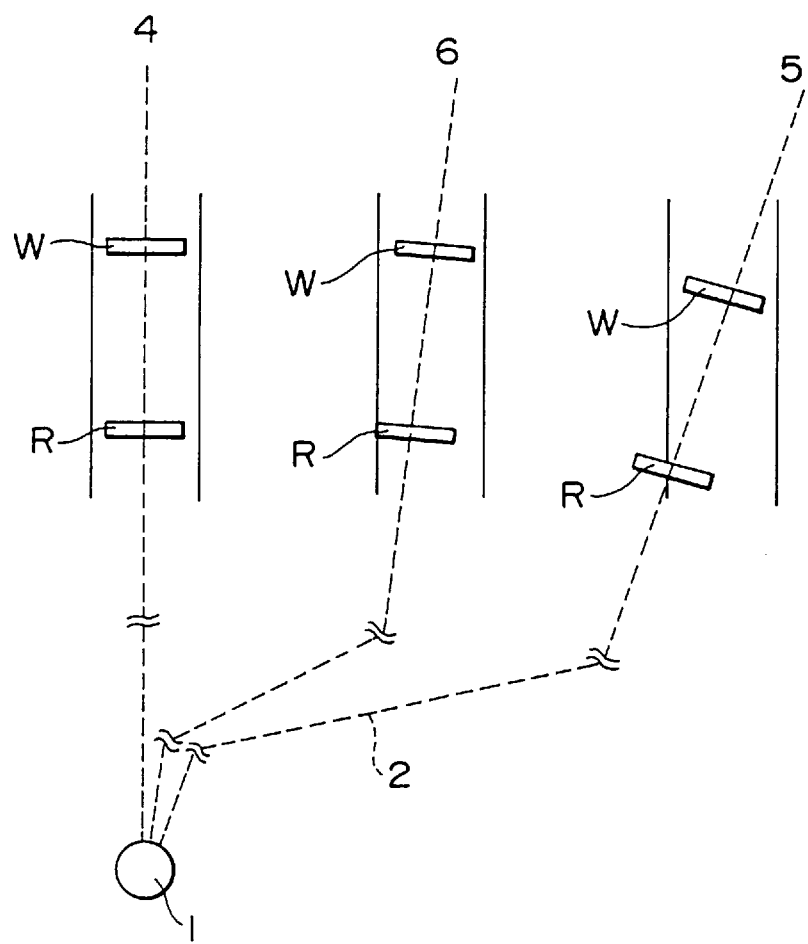
FIG. 2 is an enlarged view of part of what is shown in FIG. 1.

As a result, the angle between the center line 76 and the innermost track 83 and the angle between the center line 76 and the outermost track 84 are each made half the angle formed by the outermost track 5 of FIG. 2 on the one hand, and a straight line connecting the write head W to the read head R in the same figure on the other. That is, the maximum angular divergence is reduced to half of what is shown in FIG. 2. This allows the fifth embodiment to read sector numbers and track numbers uniformly and accurately from all tracks on the disc.

The fifth embodiment may be used in combination with any one of the first through the fourth embodiments already described.

Sixth Embodiment

Figure 14:
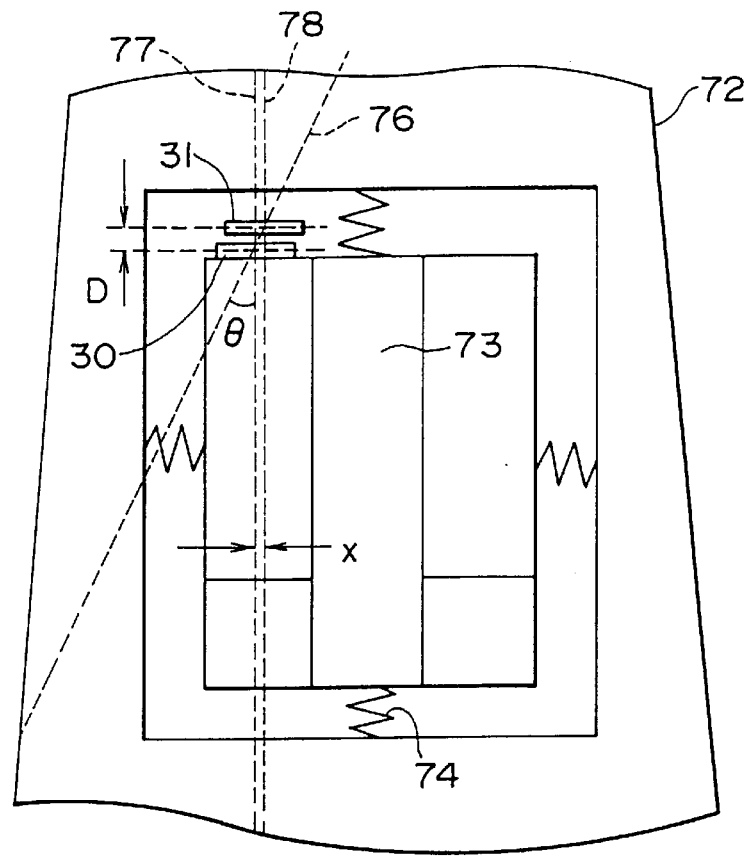
FIG. 14 is a bottom view of part of an information recording and reproducing apparatus practiced as a sixth embodiment of the invention.

FIG. 14 is a bottom view of part of an information recording and reproducing apparatus practiced as a sixth embodiment of the invention. In the sixth embodiment, the angle θ indicated in FIG. 10 is set to zero. That is, a suspension 72A is mounted so as to be aligned with the arm 71. The center line 77 of the read head 30 and the center line 78 of the write head 31 are arranged to be in parallel with the center line 75 of the arm 71. The center line 76 connecting the center of the read head 30 to that of the write head 31 forms the angle θ with respect to the center line 75 of the arm 71 (i.e., the center lines 77 and 78 of the read head 30 and write head 31). In this setup, the distance x between the center lines 77 and 78 is given by the following expression:

$x = D \cdot \tan \theta$ where, D represents the tangential distance between the read head 30 and the write head 31 (i.e., in the vertical direction of FIG. 14).

When the distance x is set appropriately in view of the angle θ established in the same manner as with the fifth embodiment of FIG. 10, the sixth embodiment offers the same effects as the fifth embodiment.

Seventh Embodiment

Figure 15:
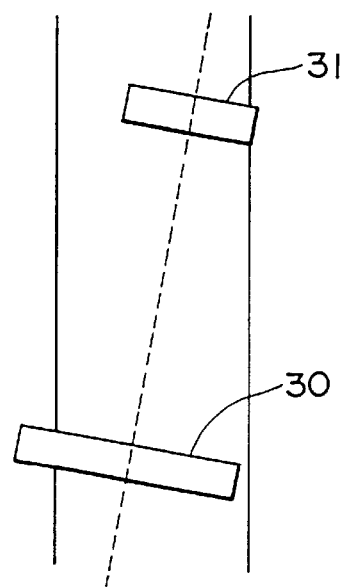
FIG. 15 is a view of part of an information recording and reproducing apparatus practiced as a seventh embodiment of the invention.

FIG. 15 is a view of part of an information recording and reproducing apparatus practiced as a seventh embodiment of the invention. The seventh embodiment has the read head 30 formed wider than the write head 31. With this arrangement in effect, even if the center of the write head 31 is positioned at the center of a track, the read head 30 traces that track to read the sector number and track number therefrom.

The above arrangement could involve having the read head 30 pick up the cross talk component simultaneously from the adjacent track. The possible drawback is circumvented preferably by making the read head 30 identical in width to the track and by having the write head 31 formed narrower than the track; it should not be attempted to make the write head 31 the same in width as the track and to make the read head 30 wider than the track. Guard bands should preferably be furnished between tracks. The seventh embodiment provides better effects if combined with the fifth embodiment of FIG. 10 or with the sixth embodiment of FIG. 14.

Eighth Embodiment

Figure 16:
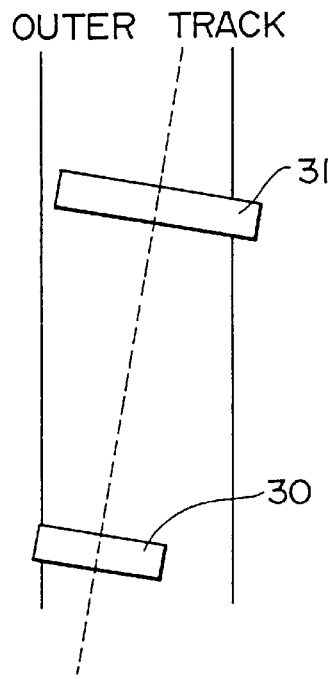
FIG. 16 is a view of part of an information recording and reproducing apparatus practiced as an eighth embodiment of the invention.

FIG. 16 is a view of part of an information recording and reproducing apparatus practiced as an eighth embodiment of the invention. As illustrated, the eighth embodiment has the write head 31 formed wider than the read head 30 as opposed to the seventh embodiment of FIG. 15. The eighth embodiment picks up less cross talk from the adjacent track than the seventh embodiment. But with the level of the read signal also lowered correspondingly, the read head 30 should preferably be one of high sensitivity. In this case, as with the seventh embodiment, the write head 31 should preferably be made the same in width as the track and the read head 30 formed narrower than the track.

As in the case of the seventh embodiment, the eighth embodiment offers better effects if combined with the fifth embodiment of FIG. 10 or with the sixth embodiment of FIG. 14.

Ninth Embodiment

As the method of signal detection for use with the magnetic disc unit, there exists a scheme of storing data coded in partial response format and decoding the coded data through the so-called most likelihood decoding (the scheme may be called the PRML scheme hereinafter). The ninth embodiment involves how the PRML scheme is applied to the embodiments described so far.

Partial response techniques are used as the modulation code for the magnetic or optical recording and reproducing apparatus. The most often utilized partial response techniques include: PRS (1, 1) (class I), PRS (1, −1) and PRS (1, 0, −1) (class IV). An operation circuit 101 shown in FIG. 17(a) employs PRS (1, 0, −1) while operation circuits 102 and 103 utilize PRS (1, −1). The system polynomial G (D) of PRS (1, 0, −1) is given as $G(D) = 1 - D^2$ and the system polynomial G (D) of PRS (1, −1) is given as $G(D) = 1 + D$ where, D stands for a delay operator.

The operation circuit 101 outputs data "1, 0, −1" consecutively when admitting an isolated logic 1; the operation circuits 102 and 103 each output data "1, −1" when admitting an isolated logic 1.

Figure 17A:
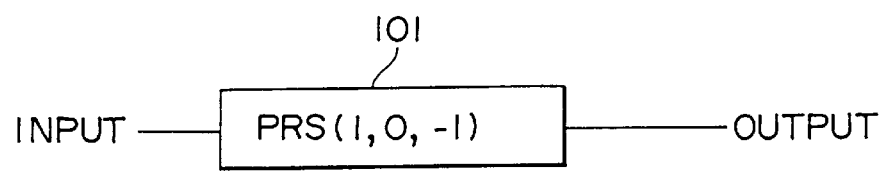
FIGS. 17(a) and 17(b) are block diagrams for describing the operating principle of a partial response modulation scheme applied to an information recording and reproducing apparatus and practiced as a ninth embodiment of the invention.
Figure 17B:
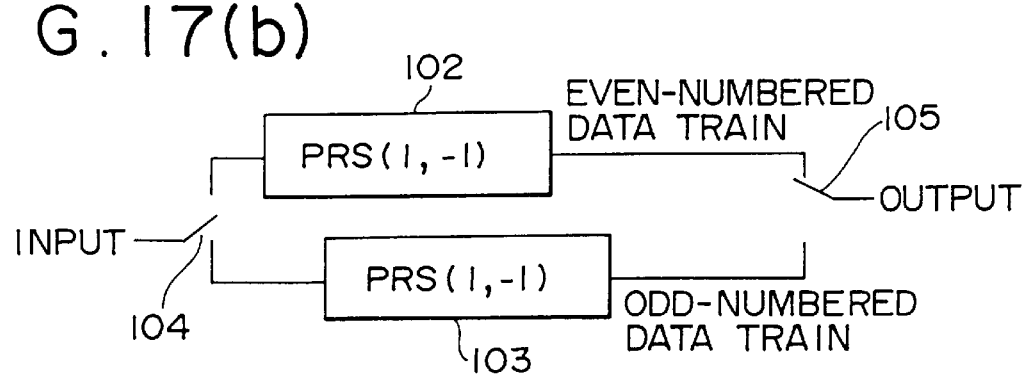

Because the operation circuit 101 of FIG. 17(a) (PRS (1, 0, −1)) has the system polynomial G (D)=1−D², the current input data item is always operated on the sample two data items earlier. Thus the odd-numbered data train sample is substantially independent of the even-numbered data train sample, each sample constituting an independent system of partial response PRS (1, −1). That is, the circuit of FIG. 17(a) is equivalent to the circuitry of FIG. 17(b) wherein odd-numbered and even-numbered data train samples are fed to and processed by, respectively, the operation circuits 102 and 103 of partial response PRS (1, −1) via a switch 104 and wherein the outputs of the two circuits are combined through a switch 105 for output.

This means that the decoding performed by the operation circuits 102 and 103 (PRS (1, −1)) is essentially the same as the decoding by the operation circuit 101 (PRS (1, 0, −1)). Below is a description of the system of partial response PRS (1, 0, −1) taken as an example.

Partial response PRS (1, 0, −1) is by itself prone to propagate errors. A single-bit error under certain conditions can trigger a catastrophic error. To forestall such an occurrence requires performing precoding through the reverse conversion of partial response.

Figure 18A:
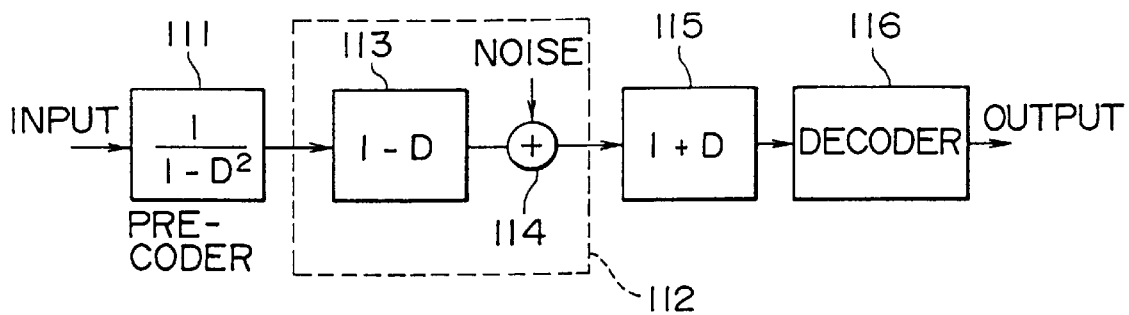
FIGS. 18(a) through 18(d) are block diagrams of typical partial response recording and reproducing systems in connection with the ninth embodiment.
Figure 18B:
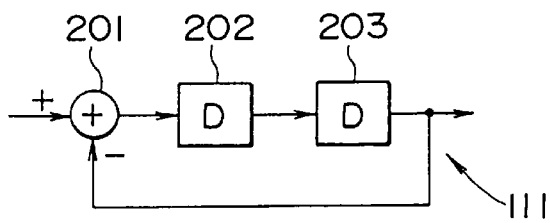

FIG. 18(a) is a block diagram of a partial response coding and decoding system that performs precoding. In FIG. 18(a), a pre-coder 111 carries out an operation of $1/(1-D^2)$. The pre-coder 111 comprises a subtractor 201 and delay circuits 202 and 203. The subtractor 201 subtracts from input data the output data from the delay circuit 203. The output of the subtractor 201 is delayed by two clock pulses through the delay circuits 202 and 203 before being output.

The pre-coder 111 converts target data into precoded data varying between values 1 and −1. The precoding is accomplished by utilizing the correlation between the target data. The pre-coded data is output to a recording channel circuit 112.

Figure 18C:
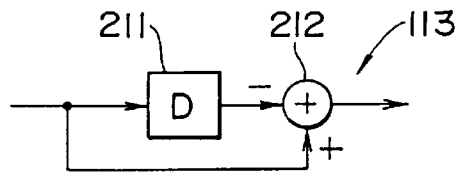

The recording channel circuit 112 is not a circuit specifically provided but is an equivalent circuit representing an intrinsic function of the magnetic recording and reproducing system. In the recording channel circuit 112 (while data is magnetically recorded or reproduced), an operation circuit 113 performs an operation of (1−D) on the output of the pre-coder 111. As depicted in FIG. 18(c), a subtractor 212 subtracts from the input data the data delayed by one clock pulse by a delay circuit 211. The result of the subtraction is output by the subtractor 212.

Figure 18D:
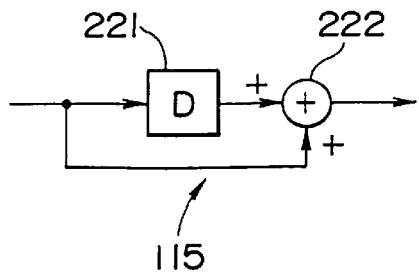

At this point, the noise generated from the actual magnetic recording channel is treated as a component to be added by an adder 114 to the above result. The noise-carrying data (i.e., magnetically recorded and reproduced data) is forwarded to an operation circuit 115 located downstream. The operation circuit 115 performs an operation of (1+D) on the output from the recording channel circuit 112. As illustrated in FIG. 18(d), the input data is added by an adder 222 to the data delayed by one clock pulse by a delay circuit 221. The result of the addition by the adder 222 is decoded by a decoder 116 for output.

Figure 19:
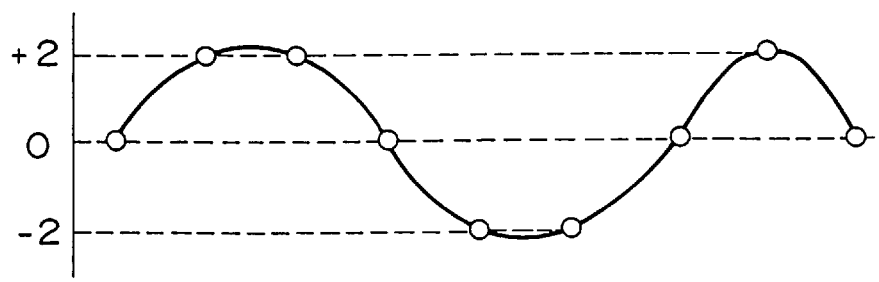
FIG. 19 is a view showing signal level changes in connection with the ninth embodiment.

The signal coming out of the recording channel circuit 112 falls illustratively into a signal level range of ±2 and takes one of three levels, −2, 0 and +2, as shown in FIG. 19. The decoder 116 decodes the signal into original binary data (1 or 0) using one of two methods: the ternary level detecting method using fixed threshold levels, or Viterbi decoding also known as the most likelihood decoding method.

The ternary level detecting method involves establishing a fixed threshold level between 0 and +2 and another fixed threshold level between 0 and −2. Decoding is carried out by checking to see if the sampling point is higher or lower than a threshold level. The circuit operating on this method is very simple in constitution but offers a relatively low ability to detect levels properly.

On the other hand, the most likelihood decoding method (Viterbi decoding) involves decoding each data item using values at downstream and upstream sampling points. From the data thus decoded, the likeliest data path is detected and established. The most likelihood decoding method provides a better detecting capability than the ternary level detecting method. When decoding the same data, the most likelihood decoding method ensures bit error rates one or two magnitudes better than the ternary level detecting method.

Figure 20:
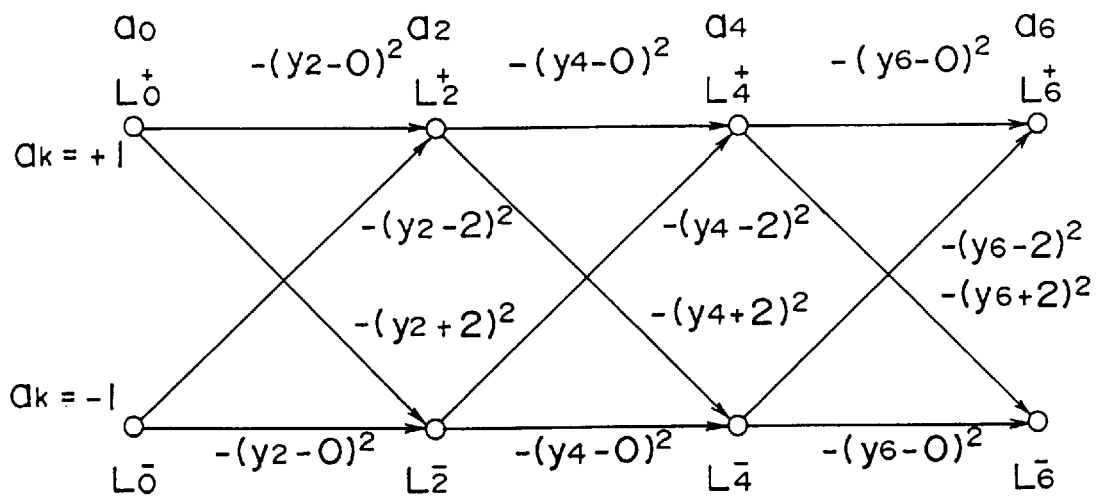
FIG. 20 is a trellis diagram associated with the ninth embodiment.

Before a typical circuit of a Viterbi decoder used as the decoder 116 is presented below, a description of Viterbi decoding is in order. A system using PRS (1, 0, −1) has the system polynomial $(1-D^2)$ and thus takes one of four states. Taking every second bit out of this system constitutes another system (i.e., PRS (1, −1)). The latter system has the system polynomial (1+D) and thus takes one of two states. A trellis diagram (likelihood trace diagram) of this system is given in FIG. 20 in which $a_k=+1$ and $a_k=-1$ represent two states and in which $-(Y_2-0)^2$, $-(Y_2-2)^2$, $-(y_2+2)^2$, etc. denote branch metrics (corresponding to momentary criteria of likelihood) for transition from one state to the other.

Viterbi decoding involves finding a path that would maximize the sum of these branch metrics. Path metrics (corresponding to likelihood path integration) $L_k^+$ and $L_k^-$ in the states $a_k=+1$ and $a_k=-1$ up to a sampling time k are given, using the path metric value Lk−2 of up to the last sampling time k−2, by the expression (1) and (2) below:

$$L_k^+ = \max\{L_{k-2}^+ + [-(Y_k-0)^2], L_{k-2}^- + [-(Y_k-2)^2]\} \quad (1)$$

$$L_k^- = \max\{L_{k-2}^+ + [-(Y_k+2)^2], L_{k-2}^- + [-(Y_k-0)^2]\} \quad (2)$$

where, max {A, B} indicates that either A or B, whichever is the greater, is to be selected.

To find an optimum path through calculation of the above metrics generally requires furnishing three square multipliers, six adders and two comparators. Also needed are a serial shift register and a parallel load register for storing the paths. Here, it is possible to use the algorithm using the differential metrics proposed by Wood et al. This is intended not to take the trouble to calculate every path metric faithfully but to simplify the circuit constitution.

Consider a Viterbi algorithm in effect where only two states exist. The Viterbi algorithm determines data while converging on a single path that would maximize the likelihood of reaching each of the states at a given time k. The decoder 116 described above is intended to execute that algorithm precisely.

For example, where only two states (either $a_k=+1$ or $a_k=-1$) exist, the branch that survives at a given point in time is only one of three patterns:

—state [−1] −> state [−1] and state [−1] −> state[+1]
—state [−1] −> state [−1] and state [+1] −> state[+1]
—state [+1] −> state [+1] and state [+1] −> state[−1]

In other words, the pattern state [+1]−>state [−1] and state [−1]−> state [+1]

does not occur. This is because the transition from state [+1] to state [−1] takes place when the following condition is met:

$$-(Y_k+2)^2 > -(Y_k-0)^2 \quad (3)$$

The above condition is rearranged as follows:

$$Y_k < -1 \quad (4)$$

On the other hand, the transition from state [−1] to state [+1] takes place when the following condition is met:

$$-(Y_k-2)^2 > -(Y_k-0)^2 \quad (5)$$

The condition above is rearranged as follows:

$$Y_k > 1 \quad (6)$$

The expressions (4) and (6) above are mutually exclusive. Thus there is no possibility of the pattern:

state [+1]−> state [−1] and state [−1]−> state [+1]

taking place.

The three possible patterns may be represented respectively by three sets of two symbols each: →↑, →→ and →↑. With the path metrics being calculated, a check is made on each branch to see which of the three patterns survives. This allows the data to be decoded.

Because the current example has only two states, the difference between the respective path metrics is given by the expression:

$$\Delta L_k = L_k^+ - L_k^- \quad (7)$$

Using the expression (7), consider performing the check to see which of the three patterns above survives. Inserting the expressions (1) and (2) into the expression (7) provides the expression:

$$\begin{aligned}\Delta L_k &= L_{k^+} - L_{k^-} \quad (8)\\ &= \max\{L_{k-2^+}, L_{k-2^-} + 4y_k - 4\} - \\ &\quad \max\{L_{k-2^+}, -4y_k - 4, L_{k-2^-}\}\\ &= -\Delta L_{k-2} + 8y_k - \min\{4, 4y_k - \Delta L_{k-2}\}\\ &\quad -\max\{-4, 4y_k - \Delta L_{k-2}\}\end{aligned}$$

where, min {A, B} indicates that either A or B, whichever is the smaller, is to be selected.

The last two terms in the expression (8) contains $4Y_k - \Delta L_{k-2}$ as the common comparative element. Comparing this value with either 4 or −4 to determine its comparative magnitude makes it possible to find which of the branches has been selected. From this, it is possible to see which of the patterns has survived for the branch. In other words, calculating the differential metrics allows the path to be determined during the process without calculating the path metrics.

The expression (8) may be rearranged into the expression (9) below depending on the magnitude of $4Y_k - \Delta L_{k-2}$:

$$\Delta L_k = \begin{cases} 4y_k - 1 & 4 < 4y_k - \Delta L_{k-2} \\ \Delta L_{k-2} & -4 \leq 4y_k - \Delta L_{k-2} \leq 4 \\ 4y_k + 4 & 4y_k - \Delta L_{k-2} < -4 \end{cases} \quad (9)$$

With $\Delta L_k = 4Y_p - 4\beta$ for change of variables, the expression (9) may be rearranged into the expression (10) below:

$$y_p - \beta = \begin{cases} y_k - 1 & -\beta + 1 < y_k - y_p \\ y_p - \beta & -\beta - 1 \leq y_k - y_p \leq -\beta + 1 \\ y_k + 1 & y_k - y_p < -\beta - 1 \end{cases} \quad (10)$$

The meanings of β and $4Y_p$ are considered herein. The symbol β takes the value given by the expression:

$$\beta \in \{-1, +1\} \quad (11)$$

The symbol β represents the transition pattern of state transition candidates in the last location p. In the trellis diagram, if a path other than the parallel path (→→) appears, i.e., if either an upward divergence (→↑) or a downward divergence (→↓) occurs, the state at that point is uniquely determined. This in turn makes it possible to determine the path from the location p one divergence earlier up to the current location k. The symbol β denotes the kind of the transition in the location p where the transition (→↑) or (→↓) other than the initial parallel path (→→) is a transition candidate.

For example, suppose that a divergence (→↑) may have occurred in the location one branch earlier (i.e., at the most recent undefined branch). In that case, β=+1, and the determining conditions and the updating rules for β and $Y_p$ are as shown in FIG. 21. Where a divergence (→↓) may have occurred, β=−1. That is, the symbol β may be construed to represent the role of offsetting the threshold value for decision purposes. (This aspect will be described later with reference to Tables 1 and 2.) On the other hand, the value $Y_p$ represents the value y of the location p in question.

As described, every time a divergence occurs, the path from the location p of the last divergence up to the current sampling location k is determined. The process is repeated. All possible paths that have yet to be established need to be stored. A random access memory should be used here to store the possible paths that are needed to update (i.e., establish) the path from the location p up to the current location k.

Figure 22:
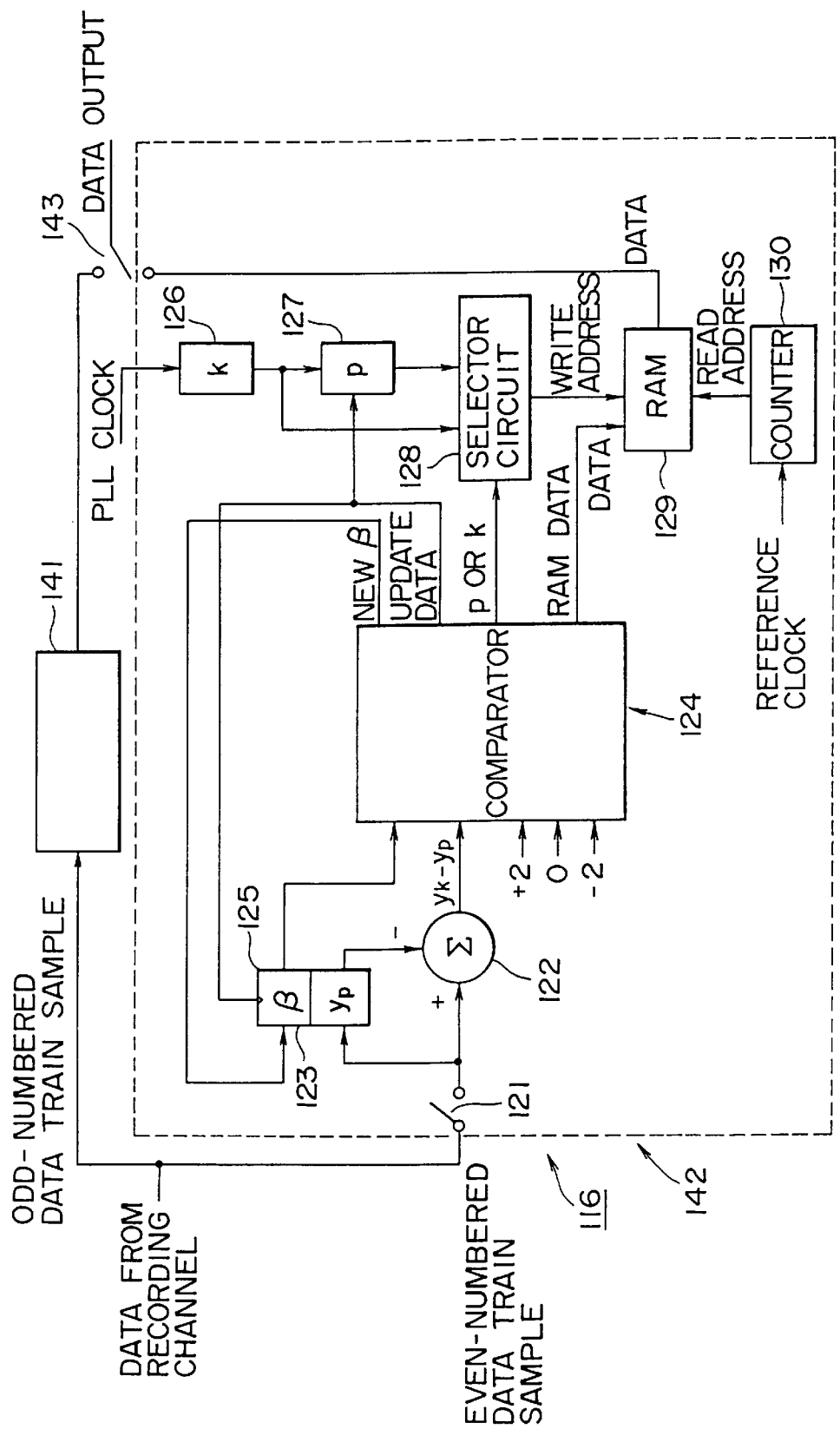
FIG. 22 is a block diagram of a decoder 116 based on the Viterbi algorithm in connection with the ninth embodiment.

FIG. 22 is a block diagram of the decoder 116 that is implemented on the basis of the Viterbi algorithm described. In FIG. 22, the reproduced data from the recording channel circuit 112 (FIG. 18(a)) is split into odd-numbered and even-numbered data train samples that are processed respectively by processing circuits 141 and 142. The respectively processed samples are restored to the original order by a switch 143 for output.

FIG. 22 shows in detail how the processing circuit 142 for processing the even-numbered data train sample is constituted. The processing circuit 141 for processing the odd-numbered data train sample is similarly constructed.

In the processing circuit 142, an odd-numbered data train sample from the recording channel circuit 112 is fed to a subtractor 122 and a register 123 via a switch 121. The register 123 accommodates the sampling value $Y_p$ of the location where the last divergence occurred. The subtractor 122 subtracts from the input even-numbered sampling value $Y_k$ the value $y_p$ retained in the register 123 (i.e., operation of $(Y_k - Y_p)$). The result is sent to a comparator 124.

The comparator 124 carries out the operations shown in Tables 1 and 2 on the threshold values +2, 0 and −2; on the output of the subtractor 122 $(Y_k - Y_p)$; and on the value β stored in a register 125. After the operations, the comparator 124 outputs the data depending on the results thereof as shown in Tables 1 and 2. Details of the operations will be discussed later with reference to FIG. 23.

TABLE 1

When β = 1:

| Input condition | $y_k - y_p < -2$ | $-2 \leq y_k - y_p \leq 0$ | $0 < y_k - y_p$ |
|---|---|---|---|
| Condition pattern | A | B | C |
| Update rule | $y_p \leftarrow y_k, \beta \leftarrow -1$ | $y_p \leftarrow y_p, \beta \leftarrow \beta$ | $y_p \leftarrow y_k, \beta \leftarrow +1$ |
| Output data | new β = −1 | new β = * | new β = 1 |
| | update = 1 | update = 0 | update = 1 |
| | p or k = p | p or k = k | p or k = p |
| | RAM data = 1 | RAM data = 0 | RAM data = 0 |

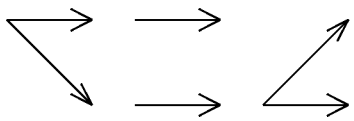

TABLE 2

When β = −1:

| Input condition | $y_k - y_p < 0$ | $0 \leq y_k - y_p \leq +2$ | $+2 < y_k - y_p$ |
|---|---|---|---|

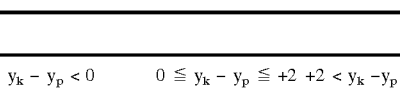

TABLE 2-continued

When β = −1:

| Condition pattern | D | E | F |
|---|---|---|---|
| Update rule | $y_p \leftarrow y_k, \beta \leftarrow -1$ | $y_p \leftarrow y_p, \beta \leftarrow \beta$ | $y_p \leftarrow y_k, \beta \leftarrow +1$ |
| Output data | new β = −1 | new β = * | new β = 1 |
|  | update = 1 | update = 0 | update = 1 |
|  | p or k = p | p or k = k | p or k = p |
|  | RAM data = 1 | RAM data = 0 | RAM data = 0 |

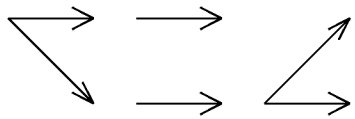

An address register 126 counts PLL clock pulses output by a PLL circuit, not shown, and stores the count value k (sampling time). Given an update command (update data) from the comparator 124, an address register 127 stores the count value k of the address register 126 as p (the time at which the last divergence occurred). A selector circuit 128, on receiving a select command (p or k) from the comparator 124, selects either the value p held by the address register 127 or the value k retained by the address register 126.

A RAM 129 accommodates the output data (RAM data) from the comparator 124 using the output (p or k) of the selector circuit 128 as the write address. A counter 130 counts up reference clock pulses output by a clock circuit, not shown. Using the output of the counter 130 as the read address, the RAM 129 reads out the stored data and sends it to the switch 143. The switch 143 restores the odd-numbered data train sample from the processing circuit 141 and the even-numbered data train sample from the processing circuit 142 into the original data order for output.

If the circuit constitution shown in FIG. 22 is adopted, square multipliers become unnecessary; one adder and two comparators need only be provided. It should be noted that the RAM 129 is additionally required to store paths.

Figure 23:
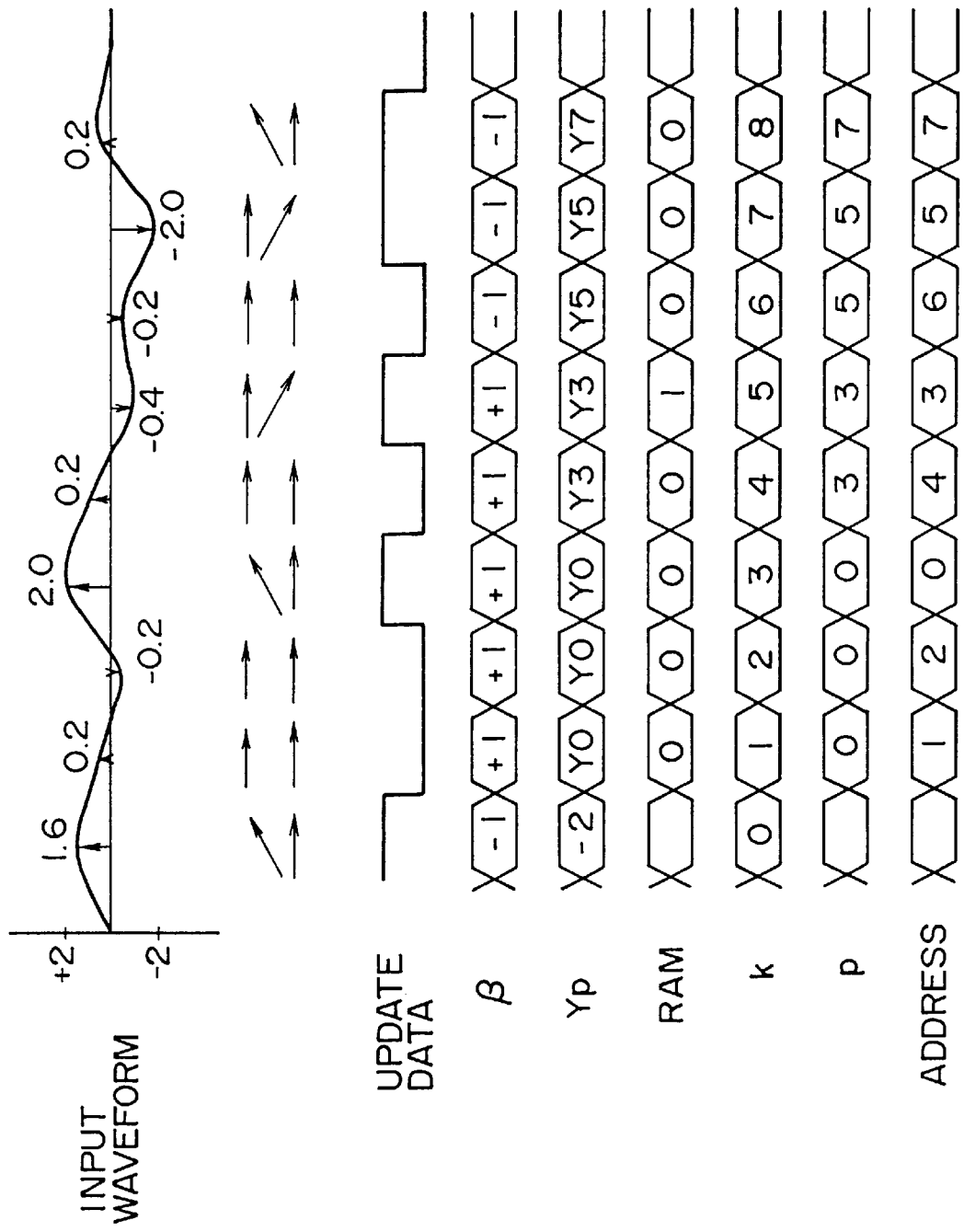
FIG. 23 is a timing chart that applies to the decoder of FIG. 22.

How the circuit of FIG. 22 illustratively works given a certain signal will now be described with reference to the timing chart of FIG. 23. Suppose that the signal whose waveform is shown in FIG. 23 has entered the decoder 116 of FIG. 22. In that case, the comparator 124 operates as described below according to the rules and conditions given in Tables 1 and 2, where the initial values of $Y_p$ and β are $Y_p = -2$ and β=−1.

[Where k=0: input $Y_k = Y_0 = 1.6$; $Y_p = -2$; β=−1]

Because $Y_k - Y_p = 1.6 - (-2) = 3.6 > 2$, the input corresponds to the condition pattern F in Table 2, i.e., an upward divergence. Thus according to Table 2, the value β in the register 125 is incremented by 1. The address register 127 has the value p (the time at which the last divergence occurred) updated so that p=k=0. The register 123 has the value $Y_p$ (the sampling value at the time of the last divergence) updated so that $Y_p = Y_0 = 1.6$.

[Where k=1: input $Y_k = Y_1 = 0.2$; $Y_p = 1.6$; β=+1; p=0]

Because $-2 \leq Y_k - Y_p = 0.2 - 1.6 = -1.4 \leq 0$, the input corresponds to the condition pattern B in Table 1, i.e., a parallel path. With the values β and $Y_p$ in the registers 125 and 123 left alone therein, the selector circuit 128 selects the value k (=1) of the address register 126 and writes data 0 (RAM data) to address k (=1) in the RAM 129 (i.e., decode operation with the logic of the data at k=1 taken as 0).

[Where k=2: input $Y_k = Y_2 = -0.2$; $Y_p = 1.6$; β=+1; p=0]

Because $-2 \leq Y_k - Y_p = -0.2 - 1.6 = -1.8 \leq 0$, the input corresponds to the pattern B in Table 1, i.e., a parallel path. With the values β and $Y_p$ in the registers 125 and 123 left alone therein, the selector circuit 128 selects the value k (=2) of the address register 126 and writes data 0 to address k (=2) in the RAM 129 (i.e., decode operation with the logic of the data at k=2 taken as 0).

[Where k=3: input $Y_k = Y_3 = 2.0$; $Y_p = 1.6$; β=+1; p=0]

Because $Y_k - Y_p = 2.0 - 1.6 = 1.4 > 0$, the input corresponds to the condition pattern C in Table 1, i.e., an upward divergence. This means that the last candidate $Y_p$ was defeated by the current value $Y_k$ (i.e., $Y_p < Y_k$). Whereas an upward divergence (β=+1) was determined earlier when k=0 (p=0), another upward divergence (β=+1) has now taken place (when k=3). It may be construed from this that what occurred the last time was a parallel path transition stemming from the upward divergence (if an upward divergence were deemed to have occurred when k=0, the path would become discontinuous when k=3).

The selector circuit 128 then selects the value p (=0) held in the address register 127 and writes data 0 to address p (=0) in the RAM 129 (i.e., decode operation with the logic of the data at k=0 taken as 0). The value p in the register 125 is incremented by 1. The value p in the address register 127 is updated using the value k of the address register 126 so that p=k=3. Furthermore, the value $Y_p$ in the register 123 is set so that $Y_p = Y_3 = 2.0$.

[Where k=4: input $Y_k = Y_4 = 0.2$; $Y_p = 2.0$; β=+1; p=3]

Because $-2 \leq Y_k - Y_p = 0.2 - 2.0 = -1.8 \leq 0$, the input corresponds to the pattern B in Table 1, i.e., a parallel path. With the values β and $Y_p$ left alone, the selector circuit 128 selects the value k (=4) and writes data 0 to address k (=4) in the RAM 129 (i.e., decode operation with the logic of the data at k=4 taken as 0).

[Where k=5; input $Y_k = Y_5 = -0.4$; $Y_p = 2.0$; β=+1; p=3]

Because $Y_k - Y_p = -0.4 - 2.0 = -2.4 < -2$, the input corresponds to the condition pattern A in Table 1, i.e., a downward divergence. This means that the last candidate was correct. (That is, when k=3 (p=3), an upward transition occurred stemming from the upward divergence.) Thus the selector circuit 128 writes data 1 to address p (=3) in the RAM 129 (i.e., decode operation with the logic of the data at k=3 taken as 1). The value β is decremented by 1. The value p is updated so that p=k=5. Furthermore, the value $Y_p$ is set so that $Y_p = Y_5 = -0.4$.

[Where k=6: input $Y_k = Y_6 = -0.2$; $Y_p = -0.4$; β=−1; p=5]

Because $0 \leq Y_k - Y_p = -0.2 - (-0.4) = 0.2 \leq +2$, the input corresponds to the pattern E in Table 2, i.e., a parallel path. Thus with the values β and $Y_p$ left alone, the selector circuit 128 selects the value k (=6) and writes data 0 to address k (=6) in the RAM 129 (i.e., decode operation with the logic of the data at k=6 taken as 0).

[Where k=7; input $Y_k = Y_7 = -2.0$; $Y_p = -0.4$; β=−1; p=5]

Because $Y_k - Y_p = -2.0 - (-0.4) = -1.6 < 0$, the input corresponds to the condition pattern D in Table 2, i.e., a downward divergence. This means that the last candidate was defeated. Since a parallel transition, not a downward transition, is deemed to have occurred when k=5 (p=5), the selector circuit 128 writes data 0 to address p (=5) in the RAM 129 (i.e., decode operation with the logic of the data at k=5 taken as 0). The value β is decremented by 1. The value p is updated so that p=k=7. In addition, the value $y_p$ is set so that $Y_p=Y_7=-2.0$.

[Where k=8; input $Y_k=Y_8=0.2$; $Y_p=-2.0$; β=-1; p=7]

Because $Y_k-Y_p=0.2-(-2.0)=2.2>+2$, the input corresponds to the condition pattern F in Table 2, i.e., an upward divergence. This means that the last candidate was correct. Since a downward transition is deemed to have occurred when k=7 (p=7), the selector circuit 128 writes data 0 to address p (=7) in the RAM 129 (i.e., decode operation with the logic of the data at k=7 taken as 0). The value β is incremented by 1. The value yp is set so that $Y_p=Y_8=0.2$ (FIG. 23).

Figure 24:
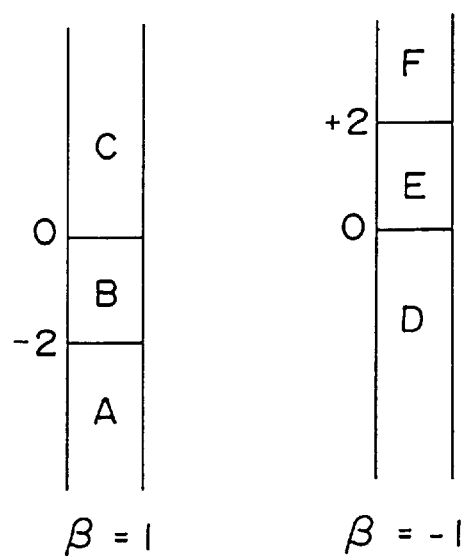
FIG. 24 is view for explaining the relationship between a value β and a threshold value in connection with the ninth embodiment.

What follows is a description of the relations between the value β and the threshold values involved. When β=1 (at the time of an upward divergence), as shown in FIG. 24, the threshold values with which to compare the value $Y_k-Y_p$ for magnitude are −2 and 0. When β=−1 (at the time of a downward divergence), as depicted in FIG. 24, the threshold values are 0 and +2. The latter threshold values are values offset by +2 relative to the former threshold values.

Figure 25:
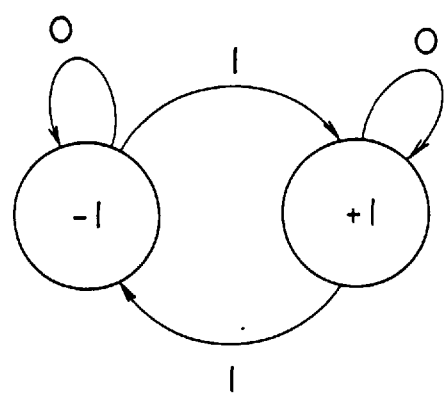
FIG. 25 is a state transition diagram that applies to the decoder of FIG. 22.

FIG. 25 is a state transition diagram relevant to the Viterbi decoder. The diagram shows that the decoded value (output) is a logical 1 upon state transition from −1 to +1, or from +1 to −1. When the state remains unchanged, the decoded value is a logical 0.

The Viterbi decoder of the constitution shown in FIG. 22 may be used in reading ID information such as sector and track numbers from the disc. In such applications, the decoder makes it possible to read with an improved error rate the data stored at high density on the disc.

Figure 26:
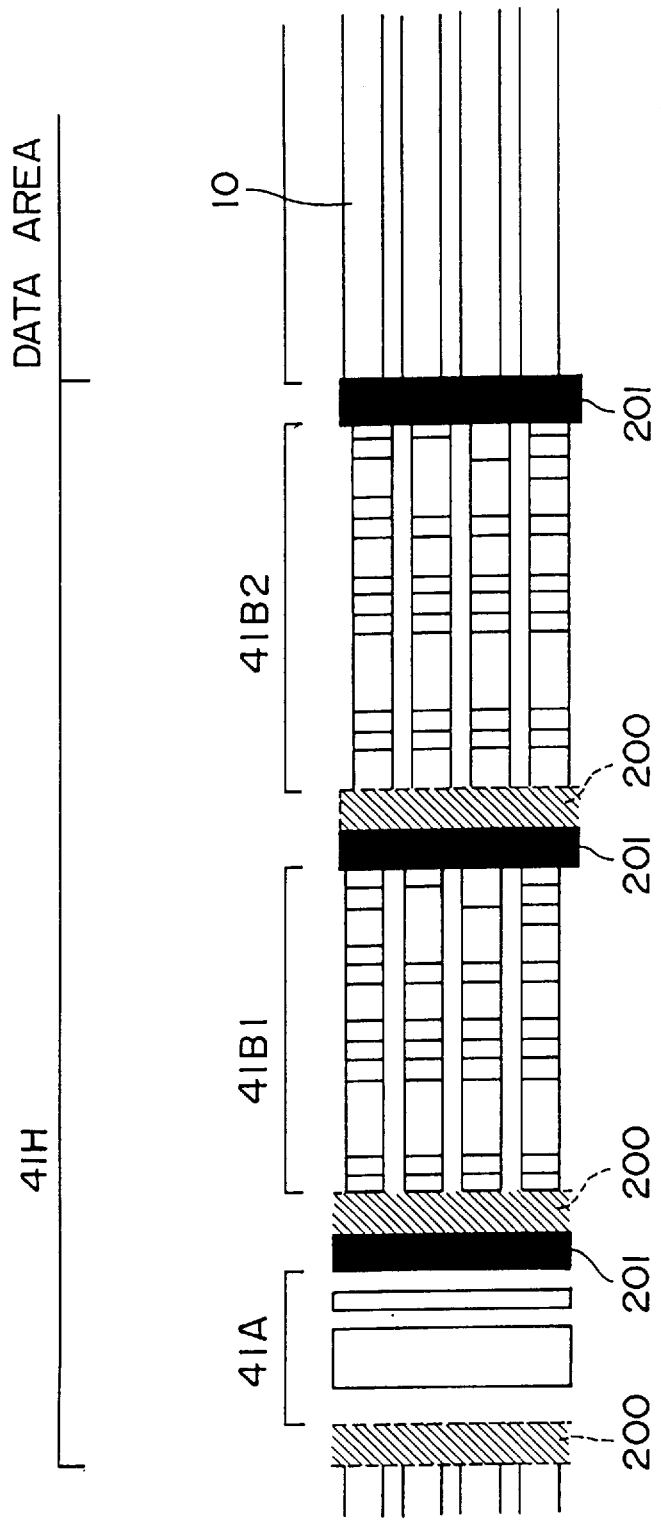
FIG. 26 is a view showing a format of an ID storage area of an information storage disc for use with the ninth embodiment.

FIG. 26 illustrates a format of an ID storage area of an information storage disc subject to the partial response and Viterbi decoding schemes described. As indicated, two initialization bits 200 are prefixed to each of the sector number storage area 41A, the read operation track number storage area 41B1 and the write operation track number storage area 41B2. These initialization 200 bits (e.g., "00" provided after pre-coding) are used to initialize the internal states (i.e., values β and $Y_p$) of the processing circuits 141 and 142 for Viterbi decoding (reproduction). Two end bits 201 are suffixed to each of the same areas prefixed with the initialization bits 200. These end bits 201 (e.g., "11" provided after pre-coding) are used to finalize the internal states of the processing circuits 141 and 142 for Viterbi decoding. The initialization bits 200 constitute a constant determined at the design stage irrespective of the data decoded from the areas preceding each area prefixed with the bits 200. The ends bits for finalizing the history of the Viterbi decoder are determined according to the encoding rules.

In read mode, as described in connection with the embodiments mentioned earlier, tracking servo is executed so that the read head 30 will run along the center of the track 10 to read the sector number storage area 41A and read operation track number storage area 41B1. Since each of the sector number storage area 41A and the read operation track number storage area 41B1 is suffixed as mentioned with the signal (end bits 201) for finalizing the internal states (values β and $Y_p$) of the processing circuits 141 and 142, the areas involved are read and decoded properly and the results are finalized.

Figure 27:
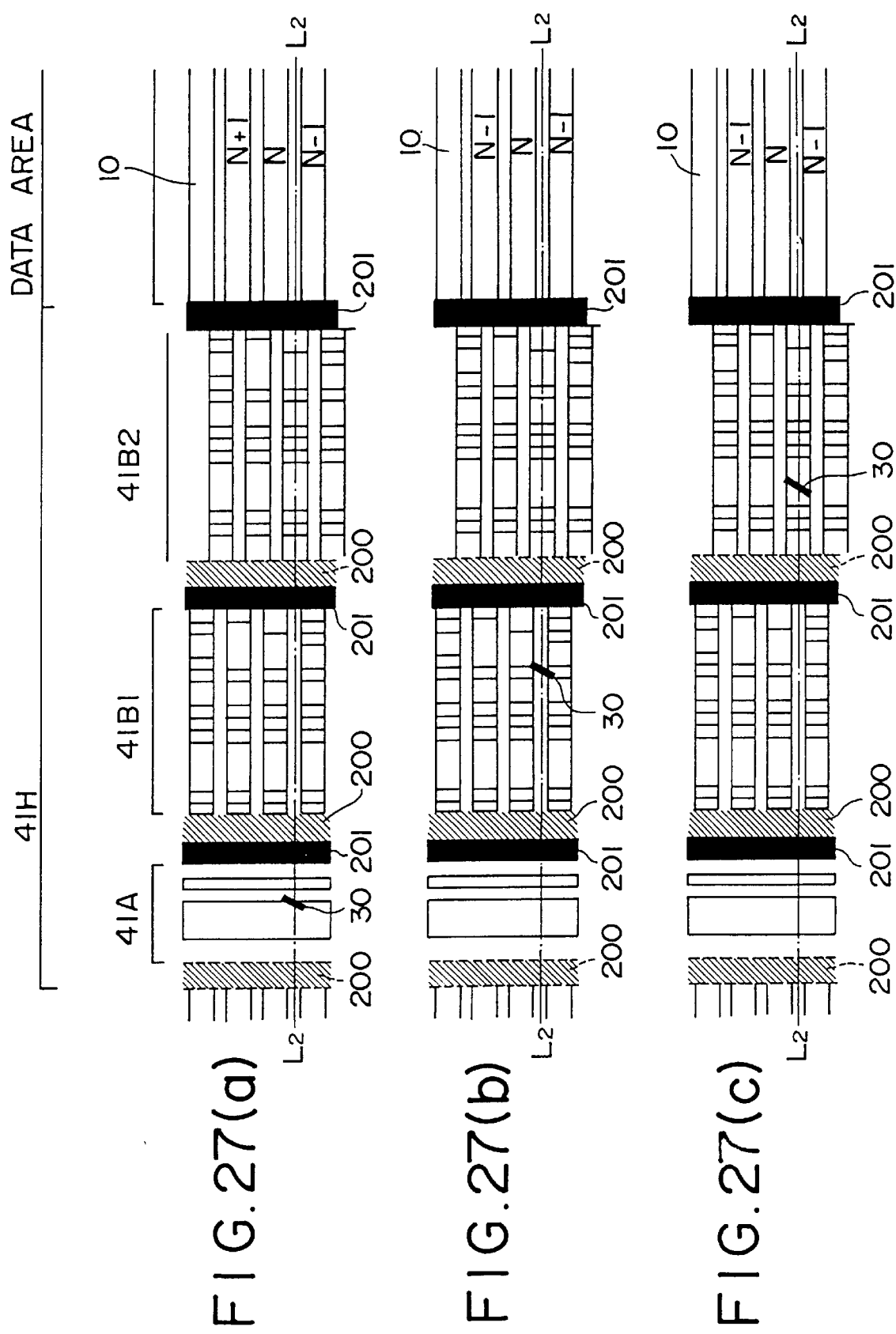
FIGS. 27(a) through (c) are other formats of the ID storage area of the information storage disc for use with the ninth embodiment.

Described below is the ID read operation performed for write mode with reference to FIGS. 27(*a*) to 27(*c*). To write data to an N-th track first requires positioning the read head 30 to the center line L2 offset relative to the N-th track. The read head 30 obtains correct sector number data by reading the sector number storage area 41A. Over the read operation track number storage area 41B1, the read head 30 is simply allowed to move past it since the head traverses two different magnetization patterns of the N-th track and the (N−1)st track.

Moving over the write operation track number storage area 41B2, the read head 30 reads the track number correctly therefrom. The track number thus read is decoded back to the track number data. Since the sector number storage area 41A and the write operation track number storage area 41B2 are each suffixed with the signal (end bits 201) for finalizing the internal states of the processing circuits 141 and 142 as described, the respective areas are decoded correctly.

Tenth Embodiment

With the ninth embodiment (FIG. 26), it is necessary for the read head 30 in write mode to move past the read operation track number storage area 41B1. For this reason, the initialization bits 200 or end bits 201 are provided to initialize or finalize the internal states of the processing circuits 141 and 142 (FIG. 22) for the respective areas (41A, 41B1 and 41B2). The arrangement allows the areas involved to be decoded independently of one another. With four bits (initialization and end bits) needed to a single area, the three areas involved (41A, 41B1 and 41B2) require furnishing a total of 12 bits.

The tenth embodiment envisages reducing the number of the additional bits from the total of 12 to eight. This is accomplished by writing to the disc special data as a signal for restoring the status change within the decoder to its initial state while the read head is moving past the areas not to be read.

Figure 28:
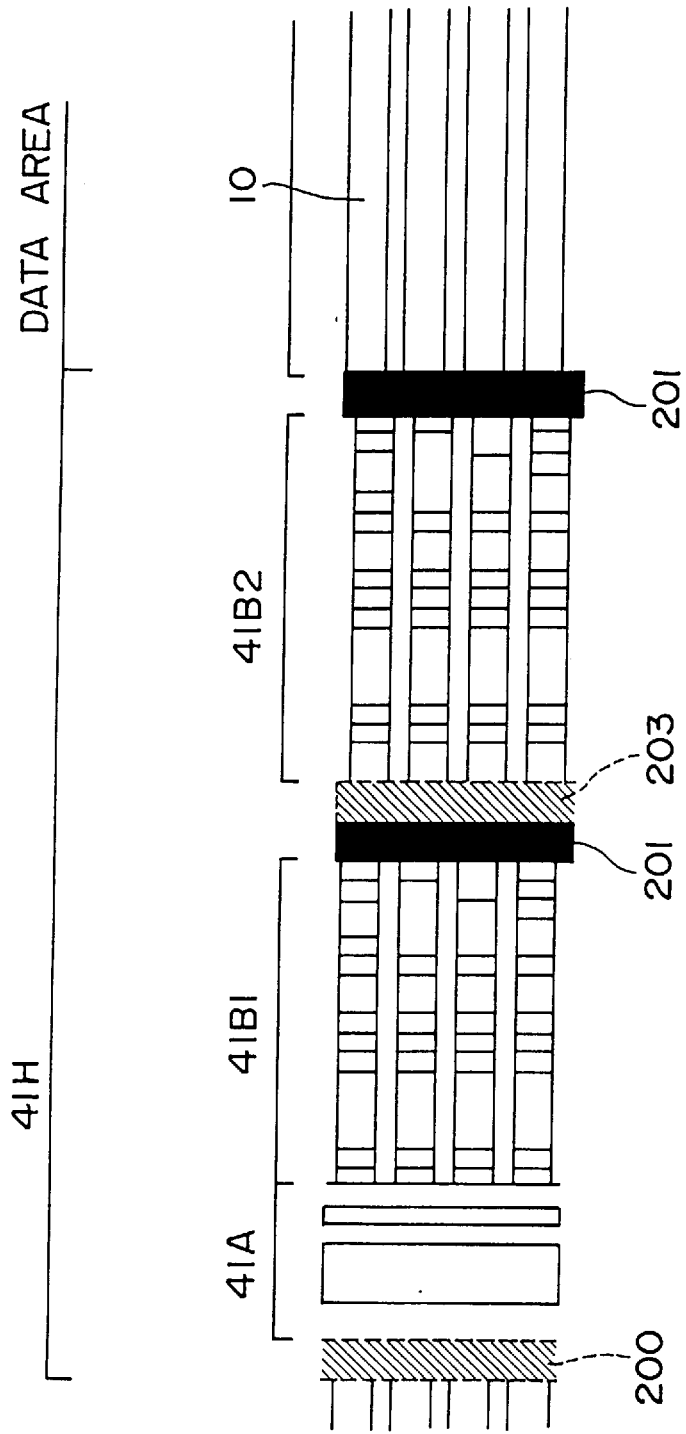
FIG. 28 is a view showing magnetization patterns on an information recording disc practiced as a tenth embodiment of the invention.

FIG. 28 shows magnetization patterns on an information recording disc practiced as the tenth embodiment of the invention. At the beginning of the sector number storage area 41A are two initialization bits 200 (e.g., "00" provided after pre-coding) for initializing the internal status of the decoder. At the end of both the read operation track number storage area 41B1 and the write operation track number storage area 41B2 are two end bits 201 each (e.g., "11" provided before pre-coding), the bits being used to finalize the internal status of the decoder upon Viterbi decoding. In addition, at the beginning of the write operation track number storage area 41B2 are two adjusting bits 203. The adjusting bits 203 are used to keep the same internal status of the decoder 116 before and after the period of the read head moving past unnecessary areas in the course of Viterbi decoding.

In read mode, as described in connection with the embodiments mentioned earlier, tracking servo is executed so that the read head 30 will run along the center of the track 10 to read the sector number storage area 41A and read operation track number storage area 41B1. Since the read operation track number storage area 41B1 is suffixed as mentioned with the end bits 201 for finalizing the internal status of the decoder, the sector number and the track number are decoded the moment these end bits are evaluated.

What follows is a description of the ID read operation performed for write mode with reference to FIGS. 29(*a*) to 29(*c*). To write data to an N-th track first requires positioning the read head 30 to the center line L2 offset relative to the N-th track. The read head 30 obtains correct sector number data by reading the sector number storage area 41A. Over the read operation track number storage area 41B1, the read head 30 is simply allowed to move past it since the head traverses two different magnetization patterns of the N-th track and the (N−1)st track.

Because the data read at this point is highly likely to be erroneous, the decoder 116 of FIG. 22 is prevented from proceeding in its decode operation. This is accomplished by masking the read signal with a gate signal indicating that the read head 30 is moving past the read operation track number storage area 41B1. With the read signal thus masked, the decoder has its internal status (i.e., values β and $Y_p$) protected against erroneous updates.

After moving past the read operation track number storage area 41B1, the read head 30 resumes decoding when the write operation track number storage area 41B2 is encountered. At this point, the waveform read during the period of the read head 30 moving past the area 41B1 would, if left unadjusted, result in a discrepancy between the retained internal status of the decoder and the read signal. To suppress that discrepancy requires utilizing the adjusting bits 203. The adjusting bits 203 allow the retained internal status to match the read signal status and permit the delay circuits to be initialized. Specifically, what needs to be done is to write, as the adjusting bits 203, the magnetized state the same as that of the end portion of the sector number storage area 41A (i.e., two bits identical to the two last bits of the sector number) to the locations indicated.

With the tenth embodiment utilized, the track number is read correctly when the read head 30 runs over the write operation track number storage area 41B2 following the period of moving past the read operation track number storage area 41B1 as if nothing unusual took place. The data thus read is decoded and the track number data is obtained. Since the write operation track number storage area 41B2 is suffixed with the end bits 201 for finalizing the internal status of the decoder, the respectively areas are read and decoded properly.

According to the tenth embodiment shown in FIG. 28, eight bits need only be added to the recorded areas for error-free subsequent reproduction: two initialization bits 200 prefixed to the sector number storage area 41A; two end bits 201 (finalizing bits) suffixed to the read operation track number storage area 41B1; another two end bits 201 suffixed to the write operation track number storage area 41B2; and two adjusting bits prefixed to the write operation track number storage area 41B2.

As described, the invention involves forming in advance those areas on the disc to which sector numbers or track numbers are recorded. The invention when embodied allows the sector numbers or track numbers to be reproduced unfailingly regardless of the slightly dislodged position of the read head with respect to the tracks.

As many apparently different embodiments of this invention may be made without departing from the spirit and scope thereof, it is to be understood that the invention is not limited to the specific embodiments thereof except as defined in the appended claims.

What is claimed is:

1. An information recording and reproducing apparatus for writing and reading data to and from an information storage disc having tracks divided into a plurality of sectors, each of said sectors being divided into a servo data area for storing servo data and a data storage area for storing written data, said data storage area having an ID storage area previously formed therein in the radial direction of the disc, said ID storage area storing sector numbers and track numbers, said sector numbers designating said sectors, said track numbers designating said tracks, said ID storage area having said sector numbers and said track numbers recorded therein previously and magnetically, said information recording and reproducing apparatus comprising:

a write head for writing information to said tracks;

a read head for reading information from said tracks, said read head being separated from said write head by a predetermined distance in the direction of said tracks;

a rotating arm rotated on a suitable axis;

an arm driving circuit for driving said rotating arm; and data detecting means for detecting data using a read signal read by said read head;

wherein said write head and said read head are attached to said rotating arm so as to be positioned in a substantially aligned manner on the innermost track and on the outermost track of said information storage disc;

wherein said write head and said read head are mounted so as to be aligned along a head alignment center line which passes through the gap center of said write head and the gap center of said read head and wherein the head alignment center line intersects the center line of said rotating arm at a point distal from both said write head and said read head and intersects the center line of said rotating arm at an angle θ;

wherein, when a tangent to the track substantially in the middle between the innermost and the outermost tracks coincides with the center line connecting the head gaps, said angle θ equals the angle formed between said tangent and the center line of said rotating arm; and wherein said sector numbers are recorded not only along said tracks but also in the radial direction continuously between adjacent tracks on said information storage disc.

2. An information recording and reproducing apparatus according to claim 1, wherein the center line of said write head is separated from the center line of said read head by a distance X given by the expression:

$$X = D \cdot \tan \theta$$

where, D represents the distance between said read head and said write head in the direction of tangents to said tracks.

3. An information recording and reproducing apparatus according to claim 2, wherein the width of said read head is greater than the width of said write head.

4. An information recording and reproducing apparatus according to claim 1, wherein the width of said read head is the same as the width of each of said tracks.

5. An information recording and reproducing apparatus according to claim 1, wherein the width of said write head is greater than the width of said read head.

6. An information recording and reproducing apparatus according to claim 5, wherein the width of said write head is the same as the width of each of said tracks.

7. A method of storing information having tracks divided into a plurality of sectors, each of said sectors being divided into a servo data area for storing servo data and a data storage area for storing written data;

wherein said data storage area has an ID storage area previously formed therein, said ID storage area storing sector numbers and track numbers, said sector numbers designating said sectors, said track numbers designating said tracks; and wherein said ID storage area has said sector number and said track numbers recorded therein previously and magnetically, comprising the steps of:

recording said sector numbers upstream of said first track number storage area using a partial response channel arrangement in said first track number storage area and in said second track number storage area downstream of said first track number storage area;

reproducing said track numbers by use of a most likelihood decoding process; and providing, at the beginning of said second track number storage area, adjusting bits relating the most likelihood decoding of said second track number storage area to the most likelihood decoding of said sector numbers.

* * * * *